United States Patent [19]
Sakamoto et al.

[11] Patent Number: 5,737,047
[45] Date of Patent: Apr. 7, 1998

[54] COLOR LIQUID CRYSTAL DISPLAY DEVICE WITH OPTICAL AXES OF RETARDATION POLARIZATION PLATES SET IN AN OPPOSITE DIRECTION OF TWIST DIRECTION OF LC MOLECULES

[75] Inventors: Katsuhito Sakamoto, Sagamihara; Zenta Kikuchi, Hamura; Satoru Shimoda, Fussa, all of Japan

[73] Assignee: Casio Computer Co., Ltd., Tokyo, Japan

[21] Appl. No.: 618,019

[22] Filed: Mar. 25, 1996

[30] Foreign Application Priority Data

| Mar. 27, 1995 | [JP] | Japan | 7-067557 |
| Mar. 27, 1995 | [JP] | Japan | 7-067558 |
| Mar. 27, 1995 | [JP] | Japan | 7-067559 |
| Mar. 27, 1995 | [JP] | Japan | 7-067560 |
| Oct. 24, 1995 | [JP] | Japan | 7-275594 |

[51] Int. Cl.$^6$ ............................ G02F 1/1335
[52] U.S. Cl. .................. 349/119; 349/99; 349/106; 349/113; 349/121
[58] Field of Search ........................ 349/117, 119, 349/121, 99, 102

[56] References Cited

U.S. PATENT DOCUMENTS

| 4,995,704 | 2/1991 | Yamamoto et al. ................ 349/119 |
| 5,032,008 | 7/1991 | Yamamoto et al. ................ 349/119 |
| 5,296,955 | 3/1994 | Tsujioka ............................. 349/121 |
| 5,548,426 | 8/1996 | Miyashita et al. .................. 349/117 |

*Primary Examiner*—William L. Sikes
*Assistant Examiner*—Julie Ngo
*Attorney, Agent, or Firm*—Frishauf, Holtz, Goodman, Langer & Chick

[57] ABSTRACT

A color liquid crystal display device comprises a liquid crystal cell having liquid crystal molecules twisted by 90°, two polarization plates, a reflector and two retardation plates. The product $\Delta n \cdot d$ of the refractive anisotropy $\Delta n$ and the LC layer thickness d of the liquid crystal cell, the retardations of the retardation plates, the directions of the transmission axes of the polarization plates and the phase delay axes of the retardation plates are set in such a way that the color of outgoing light changes to red, green, blue, black or white in accordance with an applied voltage. The transmission axis of one of the polarization plates is set in a direction of 110° to 130° in an opposite direction to the twist angle of the liquid crystal molecules and the transmission axis of the other of the polarization plates is set in a direction of 127° to 140° in an opposite direction to this twist angle.

22 Claims, 20 Drawing Sheets

COLOR LIQUID CRYSTAL DISPLAY DEVICE WITH OPTICAL AXES OF RETARDATION POLARIZATION PLATES SET IN AN OPPOSITE DIRECTION OF TWIST DIRECTION OF LC MOLECULES

BACKGROUND OF THE INVENTION

1. Field of the Invention

The present invention relates to a color liquid crystal display (LCD) device which presents a colored display without using color filters.

2. Description of the Related Art

Typical color LCD devices use color filters. The color LCD device using color filters however have low light transmittance and thus suffer dark display images.

More specifically, a color filter absorbs light of a wavelength band corresponding to the associated color as well as lights of other wavelength bands than the one associated with this color. The colored light which has passed the color filter is therefore significantly weaker than the light of the associated wavelength before having been incident to the color filter, thus making the display darker.

There are two types of LCD devices: a transmission type LCD device which displays an image using light from the back light and a reflection type LCD device which displays an image by using external light and reflecting the light at the reflector located on the back side. When an LCD device using color filters is designed as a reflection type, the light, which has been incident from the front surface side, is reflected at the reflector and leaves frontward, passes the color filters twice. This scheme makes the display significantly dark so that this LCD device can hardly be used as a display device.

To acquire the desired display colors, a color LCD device using color filters should control the amount of light passing the three pixels constituting each pixel set where three-primary color filters of red, green and blue are located. This significantly weakens the intensity of the transmission light, making the display darker. In addition, the resolution is reduced.

An ECB (Electrically Controlled Birifringence) type LCD device is known as a color LCD device which uses no color filters. The ECB type LCD device controls the birifringence effect of the liquid crystal (LC) layer of an LC cell to color light without using color filters. This device does not naturally suffer the absorption of light by color filters, has a high light transmittance and can acquire bright color display.

The ECB type LCD device can control the voltage to be applied to the LC cell to alter the birifringence property of the LC layer, thereby altering the display colors, so that each pixel can display a plurality of colors. For the same number of pixels, this device ensures higher resolution than the one which uses color filters.

Because the conventional ECB type LCD device is designed suitable to acquire colored light, it cannot display black and white which are the basic display colors. And this LCD device cannot clearly display the three primary colors of light, red, green and blue. This LCD device therefore has a difficulty in presenting colorful display, which is called full-color or multi-color display.

SUMMARY OF THE INVENTION

Accordingly, it is an objective of the present invention to provide a color LCD device which colors light without using color filters and is designed so that each pixel can clearly display black and white, and three primary colors (red, green and blue).

To achieve this object, a color liquid crystal display device according to the first aspect of the present invention comprises:

- a liquid crystal cell having liquid crystal held between a pair of substrates on which electrodes are formed on the substrates, molecules of the liquid crystal being twisted from one substrate side to the other substrate side in a predetermined direction at a twist angle of 90°;
- a pair of polarization plates arranged with the liquid crystal cell held in between; and
- two retardation plates located between one of the pair of polarization plates and the liquid crystal cell,
- wherein a value of a product $\Delta n.d$ of a refractive anisotropy $\Delta n$ of liquid crystal of the liquid crystal cell and a liquid crystal layer thickness d, values of retardations of each two retardation plates, directions of optical axes of the pair of polarization plates and optical axes of the pair of retardation plates are set in such a manner that colors of outgoing light of incident light as white light changes at least to red, green, blue, black and white in accordance with a voltage to be applied between the electrodes of both substrates of the liquid crystal cells, and
- wherein when an alignment direction of the liquid crystal molecules near one of the substrates of the liquid crystal cell is set to a direction of 0°, the optical axis of one of the pair of polarization plates extends in a direction of 110° to 140° in an opposite direction to a twist direction of the liquid crystal molecules of the liquid crystal cell and the optical axis of the other polarization plate extends in a direction of 127° to 170° in an opposite direction to the twist direction.

A color liquid crystal display device according to the second aspect of the present invention comprises:

- a liquid crystal cell having liquid crystal held between a pair of substrates on which electrodes are formed, molecules of the liquid crystal being twisted from one substrate side to the other substrate side in a predetermined direction at a twist angle of 90°; a pair of polarization plates arranged with the liquid crystal cell held in between; and two retardation plates located between one of the pair of polarization plates and the liquid crystal cell,
- wherein a value of a product $\Delta n.d$ of a refractive anisotropy $\Delta n$ of liquid crystal of the liquid crystal cell and a liquid crystal layer thickness d, values of retardations of the two retardation plates, directions of optical axes of the pair of polarization plates and optical axes of the pair of retardation plates are set in such a manner that colors of outgoing light, when incident light is white change at least to red, green, blue, black and white in accordance with a voltage to be applied between the electrodes of both substrates of the liquid crystal cells, and
- wherein the value of $\Delta n.d$ of the liquid crystal cell is 800 nm to 1100 nm, a first retardation plate of the two retardation plates has a retardation value of 350 nm to 630 nm, and a second retardation plate has a retardation value of 400 nm to 650 nm.

A color liquid crystal display device according to the third aspect of the present invention comprises:

- a liquid crystal cell having liquid crystal held between a pair of substrates on which electrodes are formed, molecules of the liquid crystal being twisted from one substrate side to the other substrate side in a predetermined direction at a twist angle of 90°; a pair of polarization plates arranged with the liquid crystal cell held in between; and two retardation plates located between one of the pair of polarization plates and the liquid crystal cell, wherein a value of a product Δn.d of a refractive anisotropy Δn of liquid crystal of the liquid crystal cell and a liquid crystal layer thickness d, values of retardations of the two retardation plates, directions of optical axes of the pair of polarization plates and optical axes of the pair of retardation plates are set in such a manner that colors of outgoing light, when incident light is white change at least to red, green, blue, black and white in accordance with a voltage to be applied between the electrodes of both substrates of the liquid crystal cells, and wherein a first retardation plate of the two retardation plates has a retardation value of 350 nm to 610 nm, a second retardation plate has a retardation value of 400 nm to 650 nm, and when an alignment direction of the liquid crystal molecules near one of the substrates of the liquid crystal cell is set to a direction of 0°, the optical axis of one of the pair of polarization plates extends in a direction of 5° to 15°, 40° to 50° or 60° to 85° in an opposite direction to a twist direction of the liquid crystal molecules of the liquid crystal cell and the optical axis of the other polarization plate extends in a direction of 95° to 105° or 130° to 175° in an opposite direction to the twist direction.

A color liquid crystal display device according to the fourth aspect of the present invention comprises:

a liquid crystal cell having liquid crystal held between a pair of substrates on which electrodes are formed, molecules of the liquid crystal being twisted from one substrate side to the other substrate side in a predetermined direction at a twist angle of 90°; a pair of polarization plates arranged with the liquid crystal cell held in between; and two retardation plates located between one of the pair of polarization plates and the liquid crystal cell, wherein a value of a product Δn.d of a refractive anisotropy Δn of liquid crystal of the liquid crystal cell and a liquid crystal layer thickness d, values of retardations of the two retardation plates, directions of optical axes of the pair of polarization plates and optical axes of the pair of retardation plates are set in such a manner that colors of outgoing light of incident light as white light changes at least to red, green, blue, black and white in accordance with a voltage to be applied between the electrodes of both substrates of the liquid crystal cells, wherein a first retardation plate of the two retardation plates has a retardation value of 350 nm to 630 nm, a second retardation plate has a retardation value of 400 nm to 650 nm, wherein when an alignment direction of the liquid crystal molecules near one of the substrates of the liquid crystal cell is set to a direction of 0°, the optical axis of one of the pair of polarization plates extends in a direction of 110° to 140° in an opposite direction to a twist direction of the liquid crystal molecules of the liquid crystal cell and the optical axis of the other polarization plate extends in a direction of 127° to 170° in an opposite direction to the twist direction, and wherein the optical axis of one of the pair of polarization plates extends in a direction of 5° to 15°, 40° to 50° or 60° to 80° in an opposite direction to a twist direction of the liquid crystal molecules of the liquid crystal cell and the optical axis of the other polarization plate extends in a direction of 95° to 105°, 130° to 175° in an opposite direction to the twist direction.

DETAILED DESCRIPTION OF THE PREFERRED EMBODIMENTS

First Embodiment

The structure of an LCD element according to the first embodiment of the present invention will now be discussed with reference to FIGS. 1 through 4.

Figure 1:
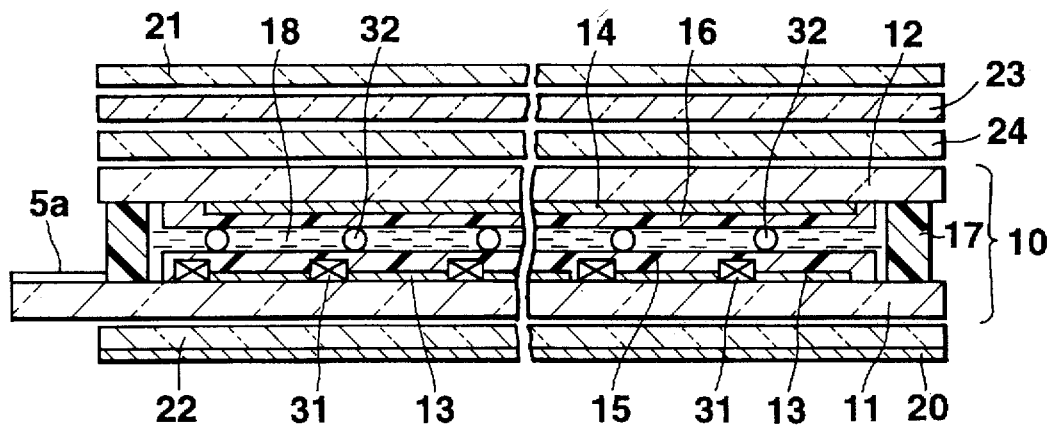
FIG. 1 is a cross-sectional view of a color LCD device according to the first embodiment of the present invention.
Figure 2:
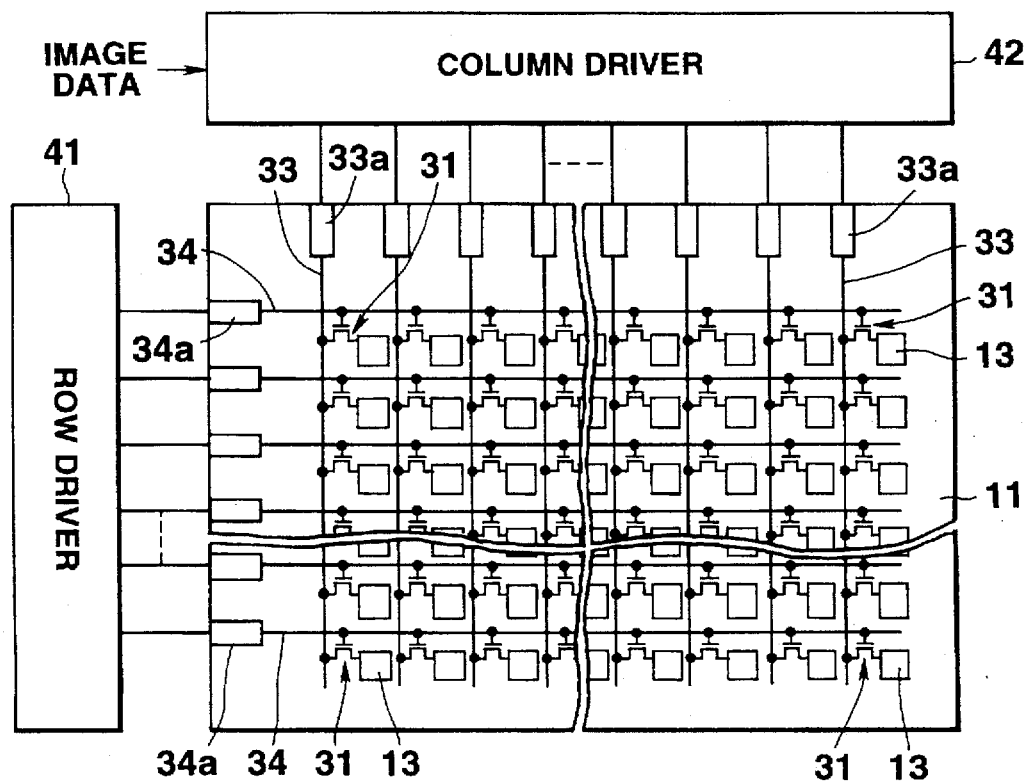
FIG. 2 is a diagram showing the structure of a back substrate of the color LCD device shown in FIG. 1.

FIG. 1 is cross-sectional view of the LCD element according to this embodiment, FIG. 2 is a plane view of a substrate on which pixel electrodes and thin film transistors are formed, and FIGS. 3A through 3E are plane views showing the positional relationship among the directions of aligning treatments, the optical axes of polarization plates, and the drawing axes of retardation plates.

This LCD element has a liquid crystal cell 10, a pair of polarization plates 21 and 22, and two retardation plates 23 and 24.

The liquid crystal cell 10 comprises a pair of transparent substrates (e.g., glass substrates) 11 and 12, connected together via a seal member 17, and a liquid crystal 18 sealed between the transparent substrates 11 and 12. Transparent pixel electrodes 13 made of ITO or the like and thin film transistors (hereinafter referred to as "TFTs") 31 whose source electrodes are connected to the associated pixel electrodes 13 are arranged in a matrix form on the substrate 11 on the back side (back substrate or the substrate on the light incident side).

As shown in FIG. 2, gate lines 34 are laid between the rows of pixel electrodes 13 and data lines 33 are laid between the columns of pixel electrodes 13. The gate electrodes of each TFTs 31 are connected to the associated gate lines 34, and the drain electrodes are connected to the associated data lines 33.

The gate lines 34 are covered with gate insulating films of the TFTs 31 excluding terminal portions 34a, and the data lines 33 are formed on the gate insulating films. Each pixel electrode 13 is connected to the drain electrode of the associated TFT 31.

The gate lines 34 are connected to a row driver (gate driver) 41, and the data lines 33 to a column driver (data driver) 42.

In FIG. 1, a transparent common electrode 14 of ITO or the like, opposing the individual pixel electrodes 13, is formed on the upper substrate (hereinafter called front substrate) 12. A reference voltage is applied to the common electrode 14.

An aligning film 15 is provided on the electrode forming surface of the back substrate 11. Another aligning film 16 is formed on the electrode forming surface of the front substrate 12. The aligning films 15 and 16 are horizontal aligning films formed of an organic polymerization compound, such as polyimide, and their opposing surfaces are subjected to an aligning treatment by rubbing.

The distance between the back substrate 11 and the front substrate 12 (more precisely, the distance between the aligning films 15 and 16=the thickness d of the liquid crystal (LC) layer) is kept at a constant value by gap members 32 studded in the liquid-crystal sealed area.

A retardation plate 24 is arranged on the front substrate 12. A retardation plate 23 is arranged on the retardation plate 24. A front polarization plate 21 is arranged on the retardation plate 23, and a back polarization plate 22 is arranged on the back substrate 11.

The polarization plates 21 and 22 and the retardation plates 23 and 24 are set with the direction of the aligning treatment of the aligning film 15 as a reference.

A reflector 20 is located on the bottom (the back) of the back polarization plate 22. The reflector 20 is a non-directional or omnidirectional type which has a metal film of silver, aluminum or the like vapor-deposited on the surface of the base sheet made of a resin film or the like.

The liquid crystal 18 is formed of a nematic liquid crystal which is added with, for example, a chiral liquid crystal for the twist alignment. The LC molecules on the aligning film 15 and 16 have their aligning directions restricted by the aligning films 15 and 16, and are twisted at a slight pretilt angle to the surfaces of the aligning films 15 and 16.

In this color LCD device, (i) the value of the product $\Delta n \cdot d$ of the refractive anisotropy $\Delta n$ of liquid crystal 18 of the LC cell 10 and the liquid crystal layer thickness d, (ii) the values of retardations Re1 and Re2 of the two retardation plates 23 and 24, (iii) the directions of the optical axes (transmission axes or absorption axes) of the polarization plates 21 and 22 and (iv) the phase delay axes or phase advancement axes of the retardation plates 23 and 24 are set in such a manner that colors of outgoing light when incident light is white change at least to red, green, blue, black and white in accordance with the voltage to be applied between the electrodes 13 and 14.

More specifically, the material and thickness of the liquid crystal 18 are selected such that the LC cell 10 has $\Delta n.d$ of 800 nm to 1100 nm. The value of the retardation Re1 of the first retardation plate 23 adjacent to the front polarization plate 21 is set to 350 nm to 630 nm, and the value of the retardation Re2 of the second retardation plate adjacent to the LC cell 10 is set to 400 nm to 650 nm.

FIGS. 3A through 3E are diagrams showing the aligned state of the LC molecules of the LC cell 10 and the directions of the optical axes (transmission axes or absorption axes; hereinafter treated as transmission axes) of the polarization plates 21 and 22 and the optical axes (phase delay axes or phase advancement axes; hereinafter treated as phase delay axes) of the retardation plates 23 and 24, as viewed from the front side of the LCD device.

Figure 3A:
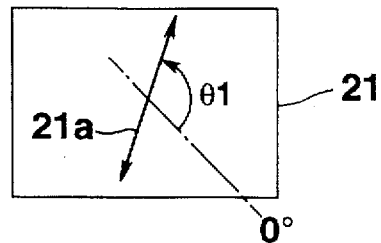
FIGS. 3A through 3E are diagrams showing the aligned state of the LC molecules and the directions of the optical axes of individual polarization plates and retardation plates of the color LCD device according to the first embodiment of the present invention, as viewed from the front side of the LCD device.
Figure 3B:
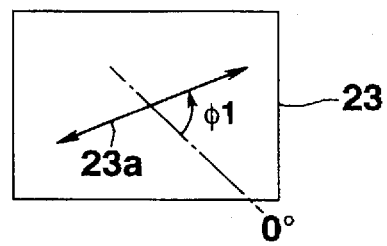
Figure 3C:
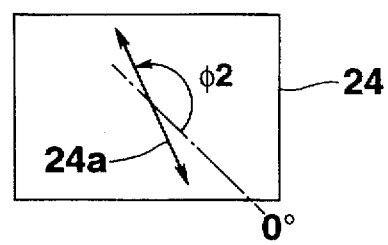
Figure 3D:
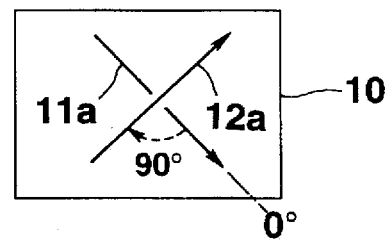
Figure 3E:
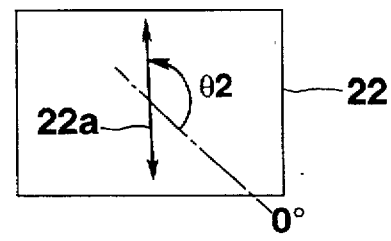

As shown in FIG. 3D, the alignment directions 11a and 12a of the LC molecules near the substrates 11 and 12 of the LC cell 10 (rubbing directions of the aligning films 15 and 16) are perpendicular to each other. The LC molecules are twisted approximately 90° clockwise (clockwise in the diagram) toward the front substrate 12 from the back substrate 11 as viewed from the front side.

With the alignment direction 11a of the liquid crystal molecules near the back substrates 11 of the LC cell 10 is set to a direction of 0°, the transmission axis 21a of the front polarization plates 21 is set shifted by an angle θ1 in the opposite direction (counterclockwise in the diagram) to the twist direction of the LC molecules. The transmission axis 22a of the back polarization plate 22 is set shifted by an angle θ2 in the opposite direction to the twist direction.

The phase delay axis 23a of the first retardation plate (retardation plate adjacent to the front polarization plate 21) 23 is set shifted by an angle φ1 in the opposite direction to the twist angle of the LC molecules with respect to the direction of 0°. The phase delay axis 24a of the second retardation plate (retardation plate adjacent to the LC cell 10) 24 is set shifted by an angle φ2 in the opposite direction to the twist angle with respect to the direction of 0°.

The deviation angles θ1, θ2, φ1 and φ2 are set in the following ranges.

θ1=110° to 130°
θ2=127° to 140°
φ1=60° to 70°
φ2=150° to 165°

This color LCD device uses external light and causes the light incident from the front side to be reflected by the reflector 20 located at the back to thereby display an image. The color LCD device is driven by a voltage applied between the opposing electrodes 13 and 14.

In this color LCD device, the incident light from the front side passes through the front polarization plate 21 to become linearly polarized light, which passes the two retardation plates 23 and 24 and the LC cell 10 in order to be incident to the back polarization plate 22.

The light which has passed the back polarization plate 22 is reflected by the reflector 20, and sequentially passes the back polarization plate 22, the LC cell 10, the two retardation plates 23 and 24 and the front polarization plate 21 to go out frontward.

In a non-selected state where no voltage is applied between the opposing electrodes 13 and 14 (in the initial twisted alignment state of the LC molecules), the incident linearly polarized light which has passed the front polarization plate 21 changes its polarized state by the birifringence effect of the retardation plates 23 and 24 and the LC layer of the LC cell 10 as the light passes the two retardation plates 23 and 24 and the LC cell 10. As a result, the linearly polarized light becomes elliptically polarized light whose light components of the individual wavelengths differ from one another, and the elliptically polarized light enters the back polarization plate 22. The light which has transmitted through the back polarization plate 22 is colored to show a color according to the wavelength distribution, and this light is reflected to go out frontward by the reflector 20. In the process of going out frontward, the colored light reflected by the reflector 20 is influenced by the birifringence effect in the opposite path to the light incident path by the LC layer of the LC cell 10 and the retardation plates 23 and 24, and this light then leaves the front polarization plate 21 with the nearly the same wavelength distribution as that of the reflected light. Therefore, the light which passes the front polarization plate 21 and goes frontward has the same color as the light reflected by the reflector 20.

When a voltage is applied between the opposing electrodes 13 and 14, the LC molecules are aligned upright while keeping the twisted alignment state. As the alignment state of the LC molecules changes, the birifringence effect of the LC layer changes. More specifically, the greater the upright angle of the LC molecules becomes, the smaller the birifringence effect of the LC layer becomes. When the birifringence effect of the liquid crystal 18 changes, the polarized state of the light incident to the back polarization plate 22 after passing through the retardation plates 23 and 24 and the LC cell 10 also changes. Consequently, the wavelength of the light passing the back polarization plate 22 varies, thus changing the color of the light reflected by the reflector 20. Therefore, the light which goes out frontward also changes its color.

As apparent from the above, the color of the outgoing light from this color LCD device, that is the display color, changes in accordance with the voltage applied to the LC cell 10 (more specifically, the voltage applied between the electrodes 13 and 14). As the applied voltage to the LC cell 10 increases, the display color changes in the order of red, green, blue, black and white.

The color LCD device of this embodiment can display black and white, which are the basic display colors, and the three primary colors of red, green and blue. This color LCD device can therefore display a clear and colorful image. Moreover, because of no color filters used, this color LCD device can present bright color display. Furthermore, a plurality of colors can be displayed by a single pixel, resulting in an improved resolution.

Although the aforementioned display color is the color of a single pixel, a color obtained by combining the colors of a plurality of pixels may be displayed.

The conventional ECB type color LCD device requires the use of the LC cell having large value of $\Delta n.d$ in order to display a plurality of colors. Because the color LCD device of this embodiment colors light by utilizing the birifringence effect of the two retardation plates 23 and 24 and the birifringence effect of the LC cell 10 and the LC layer, the LC cell 10 can have a relatively small value of $\Delta n.d$ of 800 nm to 1100 nm as mentioned above. The small value of $\Delta n.d$ of the LC cell 10 allows one or both of the refractive anisotropy $\Delta n$ and LC layer thickness d of the liquid crystal 18 to be reduced. If the LC layer thickness d is small, the electric field to be applied to the LC layer becomes stronger so that the response becomes faster and the threshold voltage becomes lower. Because liquid crystal having small Δn.d has a low viscosity, the response becomes faster and the threshold voltage becomes lower. Therefore, the color LCD device of this embodiment can be driven by a lower voltage and can display a greater number of colors than the conventional ECB type color LCD device.

The retardations Re1 and Re2 of the retardation plates 23 and 24 are relatively large: Re1=350 nm to 610 nm and Re2=400 nm to 650 nm. The retardation plates 23 and 24 can therefore ensure a large birifringence effect, thus making it possible to display many colors and increase the color purity.

Specific examples of the color LCD device according to the first embodiment will now be described with reference to the accompanying drawings.

First Specific Example

The specific example will be discussed below.

The basic structure of this example is the same as the one illustrated in FIGS. 1 and 2.

Figure 4A:
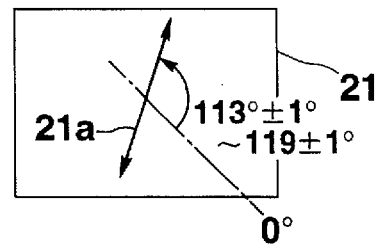
FIGS. 4A through 4E are diagrams showing the aligned state of the LC molecules and the directions of the optical axes of individual polarization plates and retardation plates of the first specific example of the color LCD device according to the first embodiment of the present invention, as viewed from the front side of the LCD device.
Figure 4B:
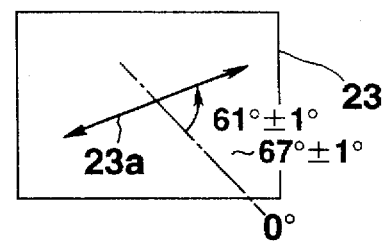
Figure 4C:
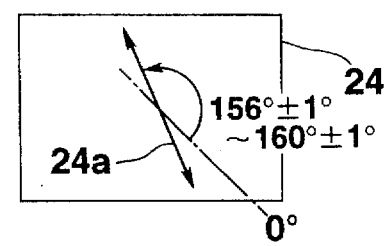
Figure 4D:
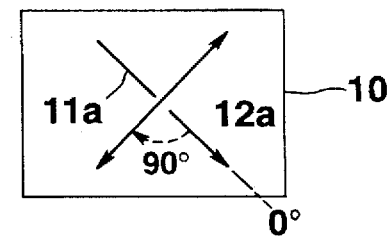

As shown in FIGS. 2 and 4D, the LC molecules of the LC cell 10 are twisted clockwise as viewed from the front side at a twist angle of approximately 90° toward the front substrate 12 from the back substrate 11.

As shown in FIG. 4A, the front polarization plate 21 is so arranged that the deviation angle θ1 of its transmission axis 21a is 113°±1° to 119°±1° with respect to the direction 11a of 0°.

Figure 4E:
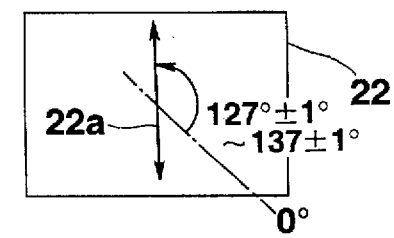

The back polarization plate 22 is so arranged that the deviation angle φ2 of its transmission axis 22a is 127°±1° to 137°±1° with respect to the direction 11a of 0°, as shown in FIG. 4E.

The first retardation plate 23 adjoining to the front polarization plate 21 is so arranged that the deviation angle φ1 of its retardation axis 23a is 61°±1° to 67°±1° with respect to the direction 11a of 0°, as shown in FIG. 4B.

The second retardation plate 24 adjoining to the LC cell 10 is so arranged that the deviation angle φ2 of its retardation axis 24a is 156°±1° to 160°±1° with respect to the direction 11a of 0°, as shown in FIG. 4C.

The value of Δn.d of the LC cell 10 is set to 800 nm to 1100 nm, desirably 920 nm to 1050 nm;

Of the two retardation plates, the first retardation plate 23 adjacent to the front polarization plate 21 has a retardation value Re1 of 570 nm±2.5 nm to 590 nm±2.5 nm;

The second retardation plate 24 has a retardation value Re2 of 585 nm±2.5 nm to 605 nm±2.5 nm.

As the applied voltage to the LC cell 10 increases, the display color of this color LCD device also changes in the order of red, green, blue, black and white. This color LCD device can therefore display a clear and colorful image.

Figure 5:
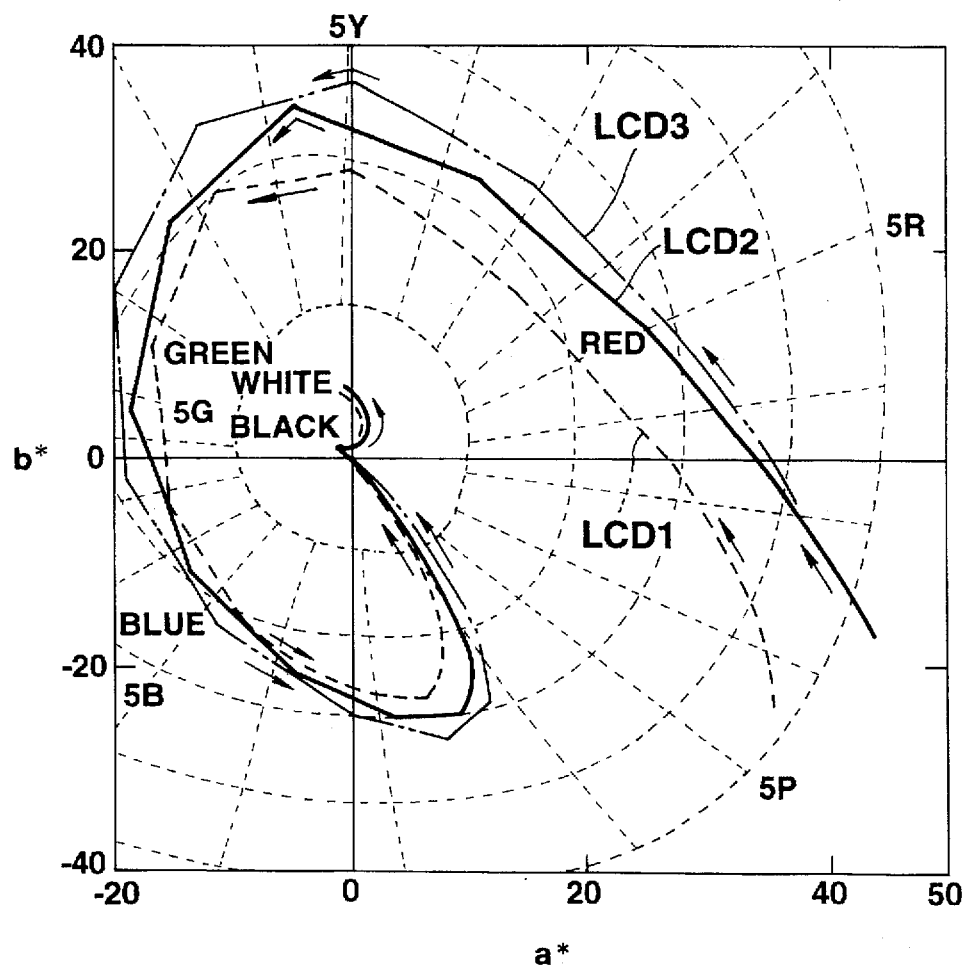
FIG. 5 is an a*–b* chromaticity diagram showing changes in display colors of the first specific example of the color LCD device.

FIG. 5 is an a*–b* chromaticity diagram showing changes in display colors of the color LCD device of the first specific example, and shows changes in colors in three sample devices LCD1, LCD2 and LCD3 with Δn.d of the LC cell 10, the retardations Re1 and Re2 of the retardation plates 23 and 24, the deviation angles φ1 and φ2 of the phase delay axes thereof, and the deviation angles θ1 and θ2 of the transmission axes thereof set in the aforementioned ranges.

The sample devices LCD1, LCD2 and LCD3 have the following characteristics.

Sample Device LCD1: θ1=113°, θ2=133°

Sample Device LCD2: θ1=115°, θ2=29°

Sample Device LCD3: θ1=115°, θ2=135°

The other characteristics, which are presented below, are common to the sample devices LCD1, LCD2 and LCD3.

Δn.d=990 nm

Re1=580 nm

Re2=595 nm

φ1=64°

φ2=158°

As shown in the a*–b* diagram in FIG. 5, the display color in the initial state where no voltage is applied between the electrodes 13 and 14 is close to purple (P) for the LCD1 and LCD2, and is substantially red for the LCD3. As the voltage applied between the opposing electrodes 13 and 14 rises, the display colors of the sample devices LCD1, LCD2 and LCD3 change among red, green and blue whose color purities are high, black which is substantially colorless and dark, and white which is substantially colorless and bright.

The display color changes in the same way not only for those sample devices LCD1, LCD2 and LCD3 but also for other LCD devices with Δn.d, Re1, Re2, φ1, φ2, θ1 and θ2 set in the aforementioned ranges.

The value of Δn.d of LC cell 10 in this color LCD device, as mentioned earlier, is relatively small, ranging from 800 nm to 1100 nm. This can thus allow one or both of the refractive anisotropy Δn and LC layer thickness d of the liquid crystal 18 to be reduced. Therefore, the color LCD device of this embodiment can be driven by a lower voltage and can display a greater number of colors than the conventional ECB type color LCD device. Further, the retardations Re1 and Re2 of the retardation plates 23 and 24 are relatively large, namely Re1=570 nm±2.5 nm to 590 nm±2.5 nm and Re2=585 nm±2.5 nm to 605 nm±2.5 nm. The retardation plates 23 and 24 can therefore provide a large birifringence effect, thus making it possible to display many colors and improve the color purity.

Moreover, the view angle dependency of the outgoing light ratio is reduced by the retardation plates 23 and 24, thus providing a wider view angle.

The polarization plates 21 and 22 may have normal polarization degrees.

Figure 6:
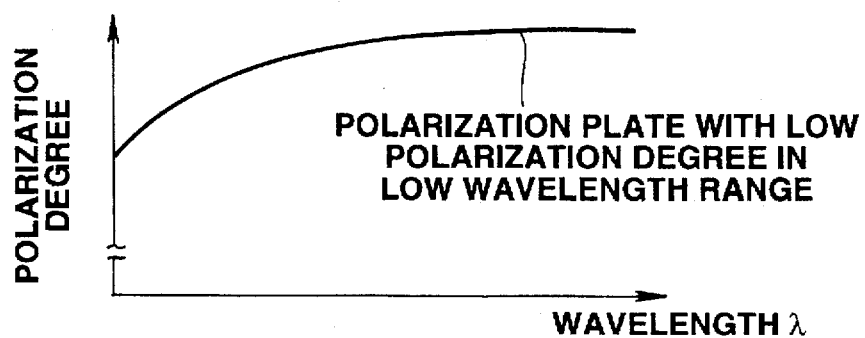
FIG. 6 is a diagram illustrating the relationship between the degree of polarization and wavelength of front and back polarization plates.

If a polarization plate having a low polarization degree with respect to light of a short wavelength range (light of a blue component) in the visible light range, e.g., the one having the polarization degree v.s. wavelength characteristic shown in FIG. 6, is used as the front polarization plate 21, it is possible to increase the amount of light of the blue component to the LCD device to clearly display blue which is generally difficult to display.

A more preferable structure for the above-described color LCD device will be discussed below.

Table 1 shows the results of evaluating the outgoing light ratio and the contrast of a color LCD device in which Δn.d of the LC cell 10 is set to 990 nm, the retardation Re1 of the first retardation plate 23 is set to 580 nm, the retardation Re2 of the second phase delay plate 24 is set to 595 nm, the deviation angle φ1 of the phase delay axis 23a of the first retardation plate 23 is set to 64°, the deviation angle φ2 of the retardation axis 24a of the second retardation plate 24 is set to 158°, while changing the deviation angles θ1 and θ2 of the transmission axes of the polarization plates 21 and 22 in the ranges of θ1=113° to 119° and θ2=127° to 137° The outgoing light ratio is the ratio of the amount of outgoing light to the amount of incident light when white is displayed, while the contrast is the ratio of the brightness of black displayed to that of white displayed.

TABLE 1

| | | angle θ1 of front polarization plate | | | |
|---|---|---|---|---|---|
| | | 113° | 115° | 117° | 119° |
| angle θ2 of back polarization plate | 127° | | 23.2 | | |
| | | | 5.2 | | |
| | 129° | 21.0 | 21.8 | 22.0 | |
| | | 4.5 | 5.4 | 4.3 | |
| | 131° | | 21.2 | 21.6 | 22.8 |
| | | | 5.0 | 4.7 | 4.3 |
| | 133° | 19.3 | 20.9 | 20.6 | 22.4 |
| | | 4.5 | 5.0 | 4.5 | 4.7 |
| | 135° | 18.7 | 19.9 | 20.2 | |
| | | 5.6 | 5.5 | 4.7 | |
| | 137° | 16.5 | 17.5 | 18.5 | |
| | | 5.5 | 5.6 | 4.5 | | upper value: outgoing light (%)
lower value: contrast

In Table 1, the LCD device with θ1=113° and θ2=133° is equivalent to the sample device LCD1, the one with θ1=115° and θ2=129° is equivalent to the sample device LCD2, and the one with θ1=115° and θ2=135° is equivalent to the sample device LCD3.

Figure 7:
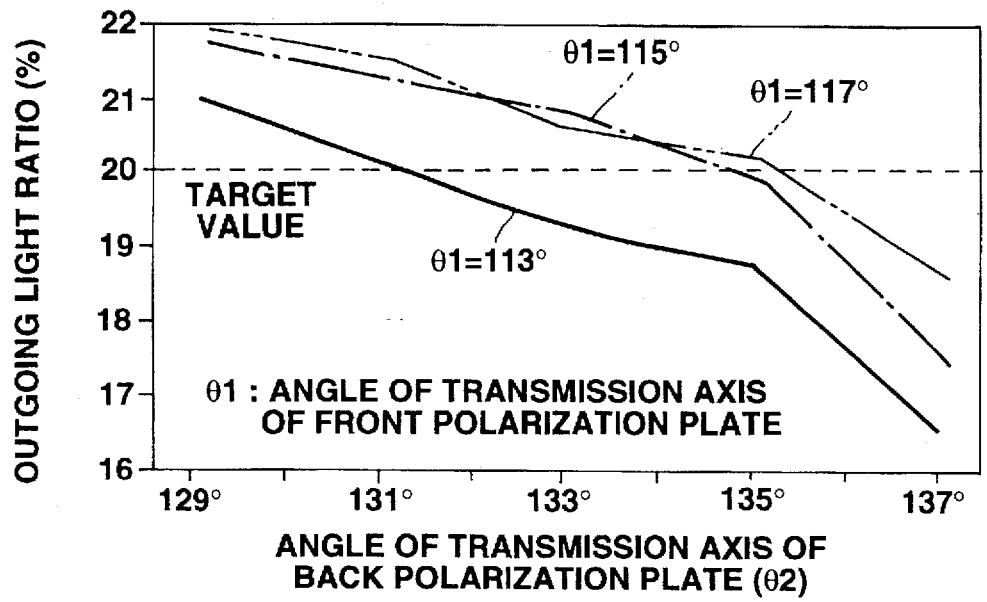
FIG. 7 is a diagram depicting the relationship between the deviation angles of the transmission axes of the front and back polarization plates and the outgoing light ratio of the first specific example of the color LCD device.
Figure 8:
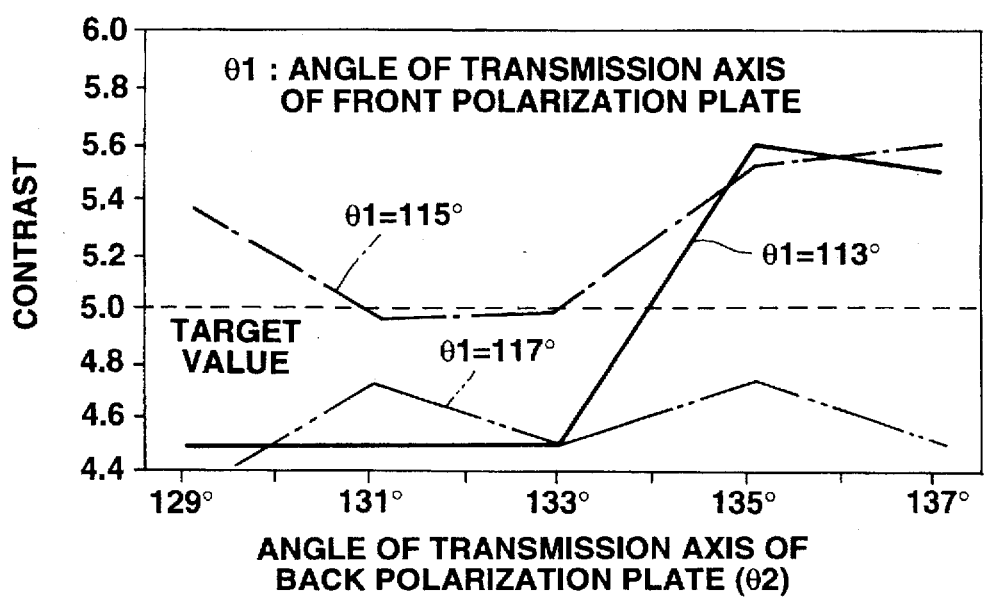
FIG. 8 is a diagram showing the relationship between the deviation angles of the transmission axes of the front and back polarization plates and the contrast of the first specific example of the color LCD device.

FIG. 7 shows the relationship between the deviation angles θ1 and θ2 of the transmission axes of the polarization plates 21 and 22 and the outgoing light ratio, and FIG. 8 shows the relationship between the deviation angles θ1 and θ2 of the transmission axes of the polarization plates 21 and 22 and the contrast.

FIGS. 7 and 8 illustrate the results of the evaluation of the outgoing light ratio and the contrast when Δn.d=990 nm, Re1=580 nm, Re2=595 nm, φ1=64°, φ2=158° and while the deviation angle θ1 of the transmission axis 21a of the front polarization plate 21 is set to 113°, 115° and 119°, and the deviation angle θ2 of the transmission axis 22a of the back polarization plate 22 is changed in the range of 127° to 137°.

As shown in Table 1 and FIGS. 7 and 8, this color LCD device has very satisfactory characteristics with the outgoing light ratio of 16.5% or greater and the contrast of 4.3 or greater. If the deviation angles θ1 and θ2 of the transmission axes 21a and 22a of the front and bask polarization plates 21 and 22 fall within the ranges of θ1=113° to 119° and θ2=127° to 137°, therefore, this color LCD device can be sufficiently used as a reflection type color LCD device.

Particularly, most of the color LCD devices with the deviation angles θ1 and θ2 of the transmission axes of the polarization plates 21 and 22 set in the ranges of θ1=115° to 117° and θ2=129° to 135-6 show better display characteristics with the outgoing light ratio of approximately 20% or above (19.9% when θ1=115° and θ2=135°) and the contrast of 4.5 or above (4.3 when θ1=117° and η2=129°).

Figure 9:
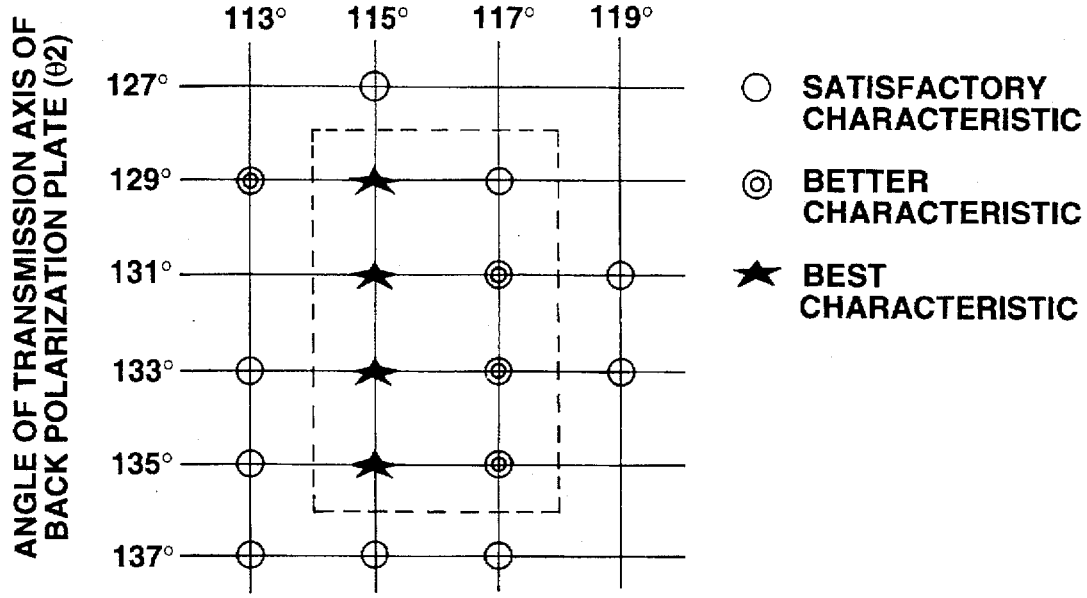
FIG. 9 is a diagram illustrating the results of the general evaluation of the outgoing light ratio, contrast and display colors with respect to the deviation angles of the transmission axes of the front and back polarization plates of the first specific example of the color LCD device.

FIG. 9 shows the results of the evaluation of the display characteristics for both the deviation angles θ1 and θ2 of the transmission axes 21a and 22a of the polarization plates 21 and 22 in view of the display colors in addition to the aforementioned outgoing light ratio and contrast.

The deviation angles θ1 and θ2, which provide a high outgoing light ratio and high contrast, high-purity red, green and blue and more colorless black and white, are in the ranges of θ1=115° to 117° and θ2=129° to 135° as indicated by a broken-lined area in FIG. 9.

The deviation angles θ1 and θ2, which provide the best display characteristics, are θ1=115° and θ2=129° to 135°.

There is no substantial change in display characteristics even when the deviation angles θ1 and θ2 of the transmission axes 21a and 22a of the polarization plates 21 and 22 are change within the range of ±1°. Therefore, the deviation angles θ1 and θ2, which provide better display characteristics, are in the ranges of θ1=115°±1° to 117°±1° and θ2=129°±1° to 135°±1° and the deviation angles θ1 and θ2, which provide the best display characteristics, are θ1=115°±1° and θ2=129°±1° to 135°±1°.

Figure 10:
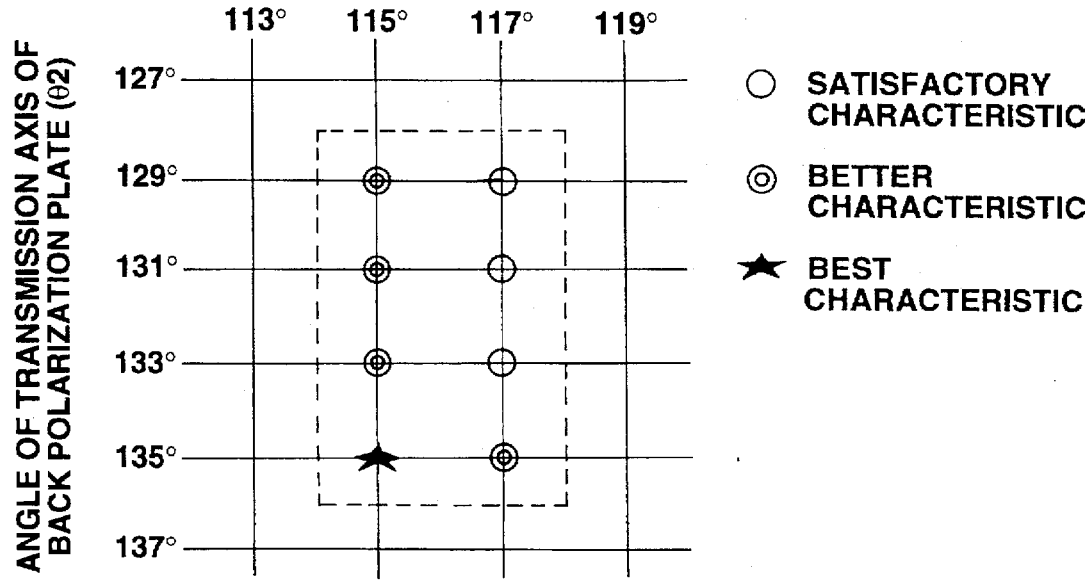
FIG. 10 is a diagram showing the results of evaluating the display colors with respect to the deviation angles of the transmission axes of the front and back polarization plates in FIG. 9, which provide better display characteristics.

FIG. 10 illustrates the results of the evaluation of the display colors of the color LCD device whose deviation angles θ1 and θ2 are set in the ranges which provide better display characteristics (θ1=115° to 117° and θ2=129° to 135°).

In this color evaluation, the device with θ1=115° and θ2=135° provides the best display. If the deviation angles θ1 and θ2 are set to θ1=115°±1° and θ2=135°±1° (±1° being the range of allowance), red, green and blue with the maximum purities and the most colorless black and white can be displayed.

The retardations Re1 and Re2 of the first and second retardation plates 23 and 24 and the deviation angles φ1 and φ2 of the phase delay axes 23a and 24a will now be considered.

To begin with, the relationship between the deviation angles φ1 and φ2 of the phase delay axes 23a and 24a of the retardation plates 23 and 24 and the display color will be considered.

Figure 11:
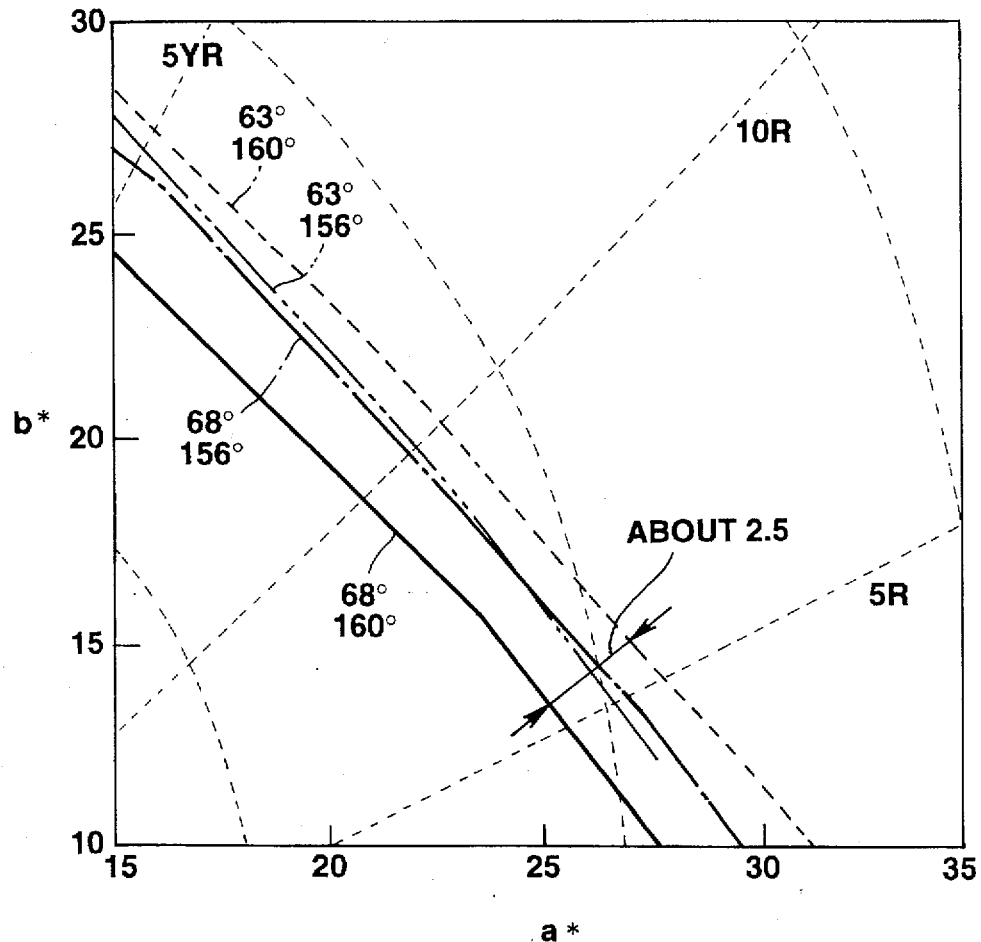
FIG. 11 is an a*–b* chromaticity diagram depicting the relationship between the deviation angles of the phase delay axes of the front and back polarization plates and display colors of the first specific example of the color LCD device.

FIG. 11 presents an a*-b* chromaticity diagram showing changes in display colors of the color LCD device in which Δn.d of the LC cell 10 is set to 945 nm, the retardation Re1 of the first retardation plate 23 is set to 580 nm, the retardation Re2 of the second retardation plate 24 is set to 595 nm, the deviation angles θ1 and θ2 of the transmission axes 21a and 22a of the polarization plates 21 and 22 are set to the aforementioned best angles (θ1=115° and θ2=135°), and the deviation angles φ1 and φ2 of the phase delay axes 23a and 24a of the retardation plates 23 and 24 are set to φ1=61°±1° to 67°±1°=60° to 68° and φ2=156°±1° to 160°±1°=157° to 161°.

This diagram shows changes in the display colors of four kinds of color LCD devices with the following combinations of the deviation angles φ1 and φ2 of the phase delay axes 23a and 24a of the retardation plates 23 and 24:

(1) φ1=63° and φ2=156°
(2) φ1=63° and φ2=160°
(3) φ1=68° and φ2=158°
(4) φ1=68° and φ2=160°

As shown in FIG. 11, those color LCD devices display almost the same colors with a slight variation within a range of approximately 2.5 on the a*-b* chromaticity diagram as long as the deviation angle φ1 is in the range of 61°±1° to 67°±1° and the deviation angle φ2 is in the range of 156°±1° to 160°±1°.

FIG. 11 shows color changes only in the area of red. The change in the display color of this color LCD device from the initial state is substantially the same as that of the sample device LCD 3 in FIG. 5 (Δn.d=990 nm, Re1=580 nm, Re2=595 nm, φ1=64°, φ2=158°, θ1 =115° and θ2=135°).

Figure 12:
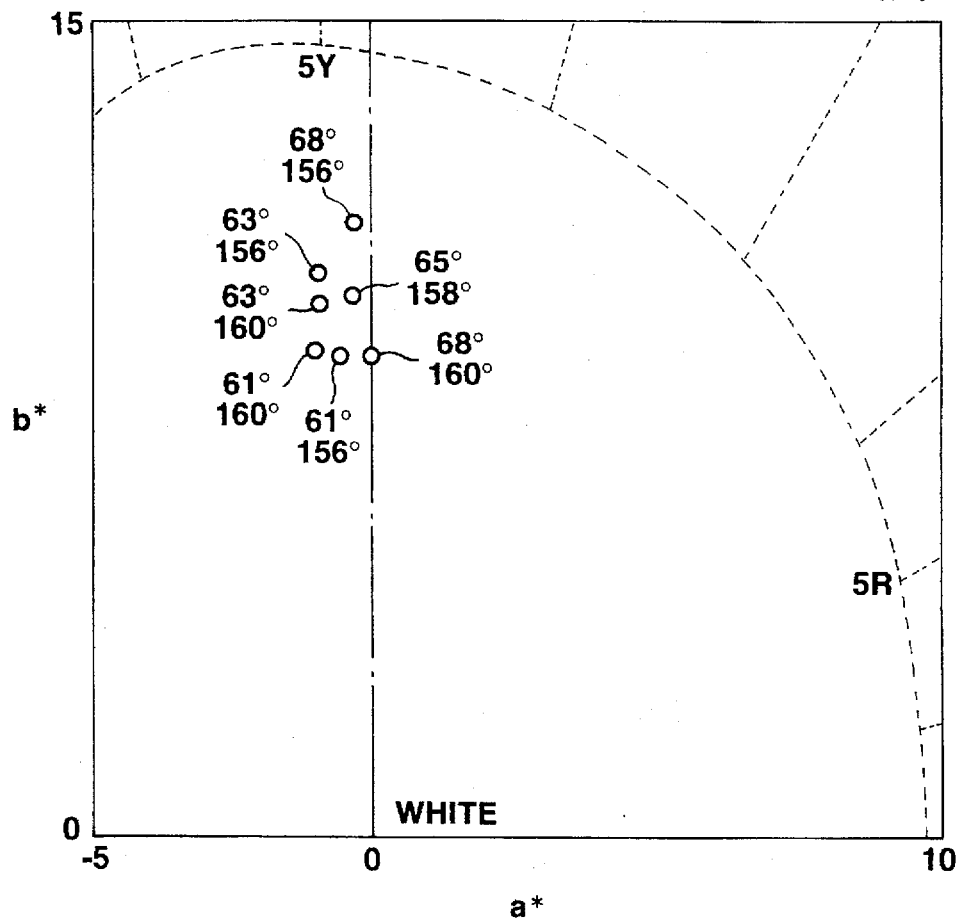
FIG. 12 is an a*–b* chromaticity diagram depicting the relationship between the deviation angles of the phase delay axes of the front and back polarization plates and the display color "white" of the first specific example of the color LCD device.
Figure 13:
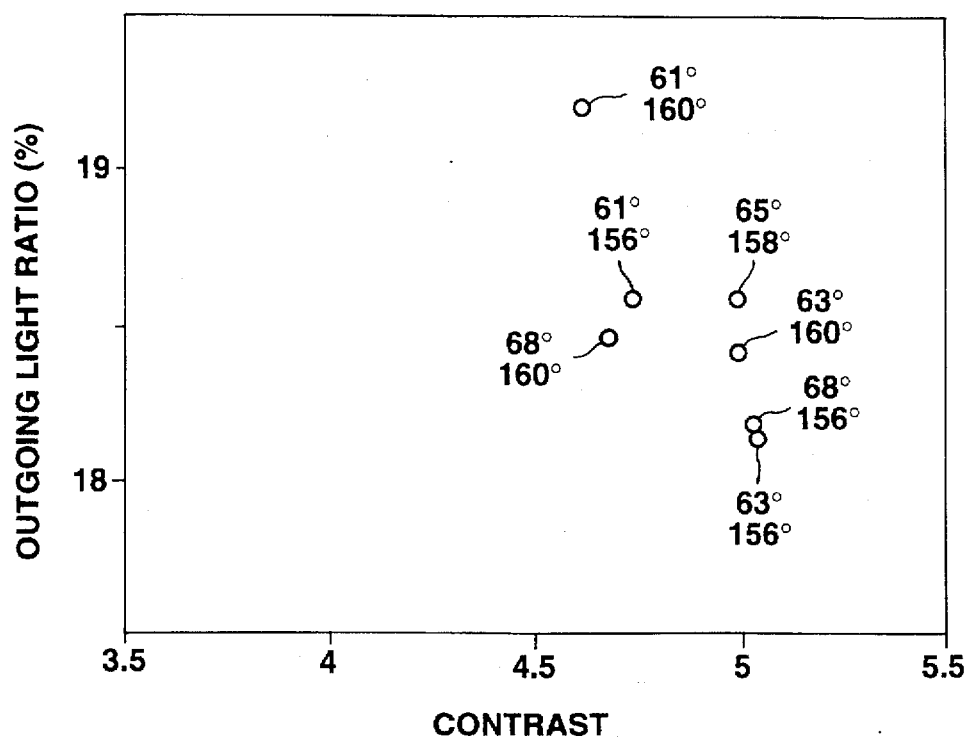
FIG. 13 is a diagram showing the relationship between the deviation angles of the phase delay axes of the front and back polarization plates and display contrast of the first specific example of the color LCD device.

FIG. 12 is an a*-b* chromaticity diagram showing the relationship among the deviation angles φ1 and φ2 of the phase delay axes 23a and 24a of the retardation plates 23 and 24 and white displayed. FIG. 13 is a diagram showing the relationship among the deviation angles φ1 and φ2, the outgoing light ratio (the ratio of the amount of the outgoing light ratio to the amount of the incident light when white is displayed) and the contrast (the ratio of the brightness of displayed black and that of displayed white).

As shown in FIGS. 12 and 13, this color LCD device can display white with a satisfactory purity and satisfactory outgoing light ratio and contrast when the deviation angle φ1 is in the range of 61°±1° to 67°±1° and the deviation angle φ2 is in the range of 156°±1° to 160°±1°.

The display of white will now be considered. With regard to the displayed color "white" of the color LCD device with the deviation angles φ1 and φ2 set in the above-given ranges, as shown in FIG. 12, the value of a* is concentrated in the vicinity of 0 while the value of b* varies depending on the deviation angles φ1 and φ2. White becomes more colorless as the value of b* approaches 0, and becomes yellowish (Y) as the value of b* becomes larger. From the viewpoint of the purity of white (degree of colorless), therefore, the desirable deviation angles 41 and 42 and the combination thereof should be so set that the value of b* comes closer to 0.

The outgoing light ratio and contrast will be considered next. The farther in the upper right in FIG. 13 the deviation angles φ1 and φ2 and their combination are positioned, the higher the outgoing light ratio and contrast become.

Figure 14:
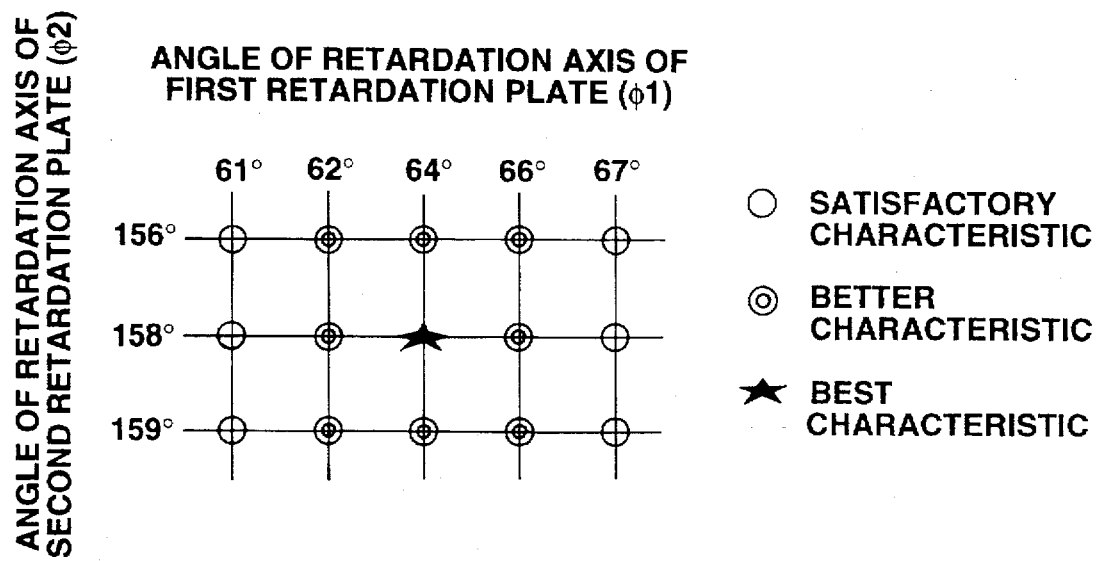
FIG. 14 is a diagram illustrating the results of the general evaluation of the deviation angles of the phase delay axes of the front and back polarization plates, the purity of the display color "white," the outgoing light ratio and the contrast of the first specific example of the color LCD device.

It is desirable that the deviation angles φ1 and φ2 of the phase delay axes 23a and 24a of the retardation plates 23 and 24 and their combination should be so set as to provide while with a higher purity and higher outgoing light ratio and contrast. FIG. 14 illustrates the results of the evaluation of the characteristics shown in FIGS. 12 and 13 from this viewpoint.

As shown in FIG. 14, the color LCD device shows sufficient display characteristics if the deviation angles φ1 and φ2 are in the ranges of φ1=61°±1° to 67°±1° and φ2=156°±1° to 159°±1° (±1° being the range of allowance where the display characteristics do not change substantially). With the deviation angle φ1=62° to 66°, the purity of white, the outgoing light ratio and the contrast are particularly high. The color LCD device with the deviation angles φ1=64° and φ2=158° show the best characteristics.

The deviation angle φ1 which provides better display characteristics has an allowance range of ±0.5°. Therefore, the deviation angle φ1 which provides better display characteristics is in the range of 62°±0.5° to 66°±0.5°.

The deviation angles φ1 and φ2 which provide the best display characteristics do not substantially change even when they change in the range of ±1° and have an allowance range of ±1°. Therefore, the deviation angles φ1 and φ2 which provide the best display characteristics are in the ranges of φ1=64°±1° and φ2=158°±1°.

The relationship between the retardations Re1 and Re2 of the first and second retardation plates 23 and 24 and the display color will be considered next.

Figure 15:
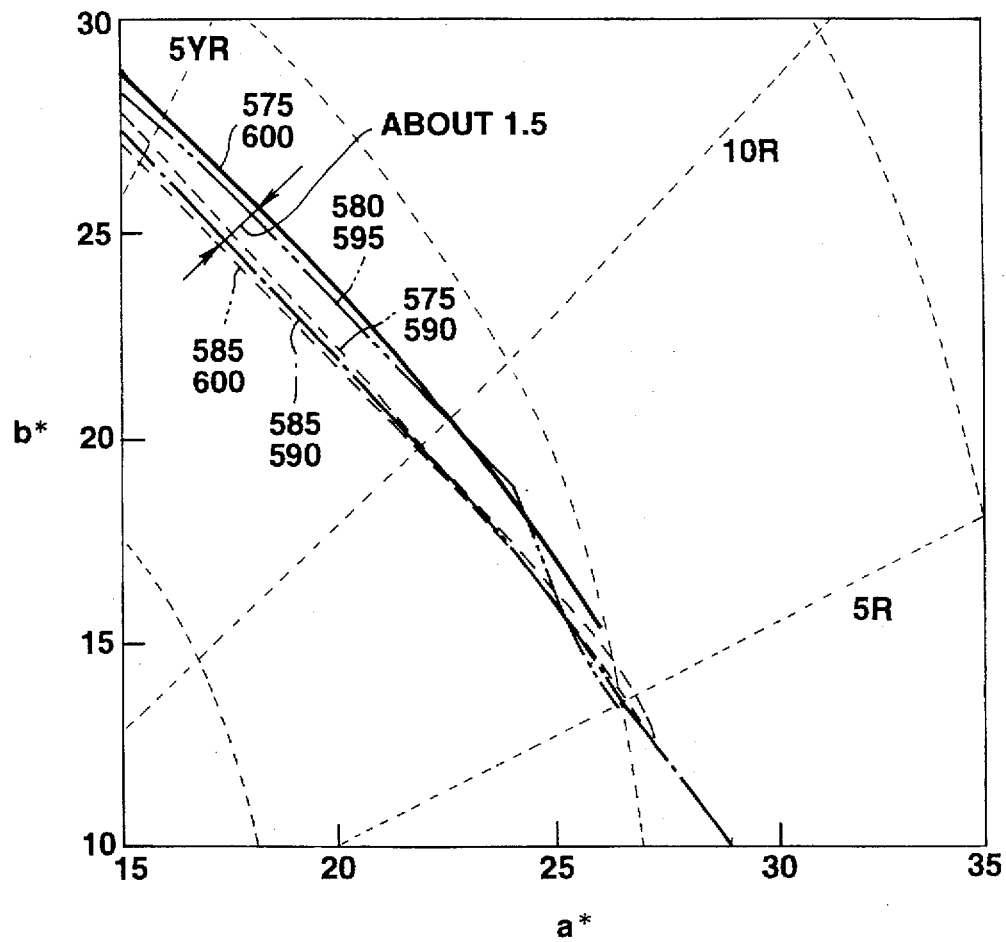
FIG. 15 is an a*–b* chromaticity diagram depicting the relationship between the retardation values of the first and second retardation plates and display colors of the first specific example of the color LCD device.

FIG. 15 presents an a*–b* chromaticity diagram showing changes in display colors of the color LCD device in which Δn.d of the LC cell 10 is set to 945 nm, the deviation angles θ1 and θ2 of the transmission axes 21a and 22a of the polarization plates 21 and 22 and the deviation angles φ1 and φ2 of the phase delay axes 23a and 24a of the retardation plates 23 and 24 are set to the aforementioned best angles (θ1=115° and θ2=135°, φ1=64° and φ2=158°), and the retardations Re1 and Re2 of the retardation plates 23 and 24 are set to the following five combinations (1) Re1=575 nm and Re2=590 nm
(2) Re1=575 nm and Re2=600 nm
(3) Re1=580 nm and Re2=595 nm
(4) Re1=585 nm and Re2=590 nm
(5) Re1=585 nm and Re2=600 nm It is to be noted that the retardations Re1 and Re2 lie in the aforementioned proper ranges of Re1=570 nm±2.5 nm to 590 nm±2.5 nm=567.5 nm to 592.5 nm and Re2=585 nm±2.5 nm to 605 nm±2.5 nm=582.5 nm to 607.5 nm.

As shown in FIG. 15, those color LCD devices display almost the same colors with a slight variation within a range of approximately 1.5 on the a*–b* chromaticity diagram as long as the retardation Re1 of the retardation plate 23 is in the range of 567.5 nm to 592.5 nm and the retardation Re2 of the retardation plate 24 is in the range of 582.5 nm to 607.5 nm even if the combination of Re1 and Re2 is changed.

FIG. 15 shows color changes only in the area of red. The change in the display color of this color LCD device from the initial state is substantially the same as that of the sample device LCD 3 shown in FIG. 8 (Δn.d =990 nm, Re1=580 nm, Re2=595 nm, φ1=64°, φ2=158°, θ1=115° and θ2=135°).

Figure 16:
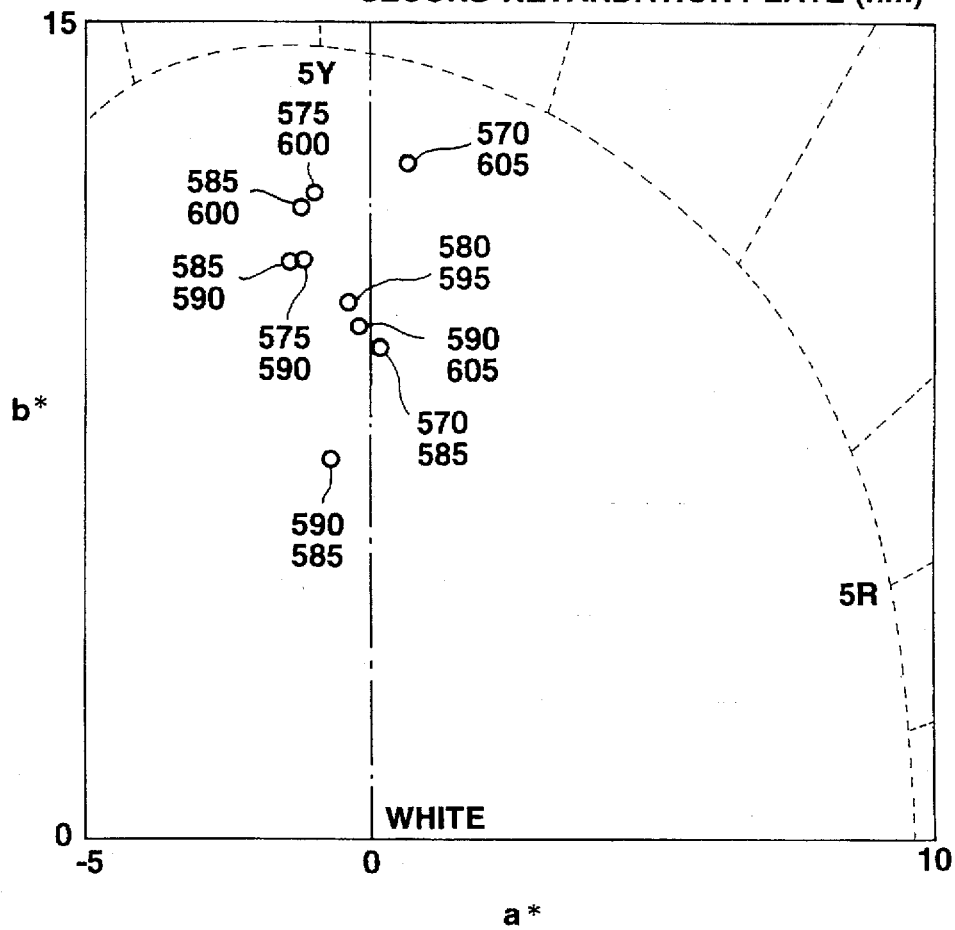
FIG. 16 is an a*–b* chromaticity diagram showing the relationship between the retardation values of the first and second retardation plates and the display color "white" of the first specific example of the color LCD device.
Figure 17:
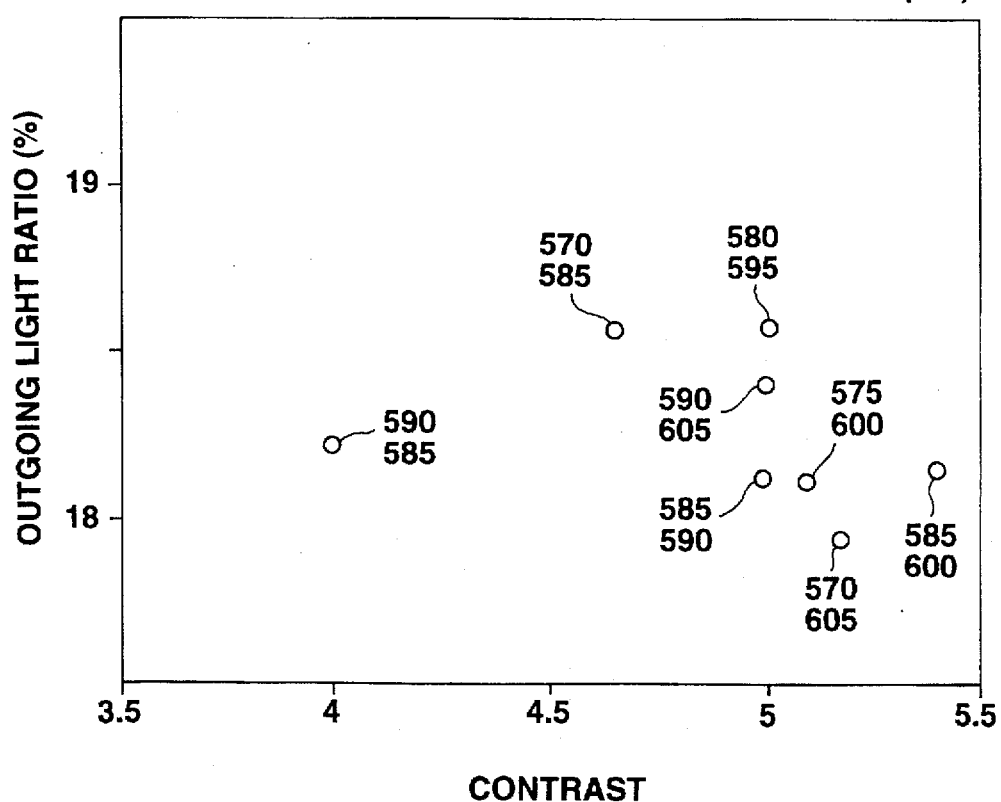
FIG. 17 is a diagram depicting the relationship between the retardation values of the first and second retardation plates and display contrast of the first specific example of the color LCD device.

FIG. 16 is an a*–b* chromaticity diagram showing the relationship among the retardations Re1 and Re2 of the retardation plates 23 and 24 and the display color "white," and FIG. 17 is a diagram showing the relationship among the retardations Re1 and Re2 of the retardation plates 23 and 24, the outgoing light ratio (the ratio of the amount of the outgoing light ratio to the amount of the incident light when white is displayed) and the contrast (the ratio of the brightness of displayed black and that of displayed white).

As shown in FIGS. 16 and 17, this color LCD device can display white with a satisfactory purity and satisfactory outgoing light ratio and contrast when the retardation Re1 of the retardation plate 23 lies in the range of 567.5 nm to 592.5 nm and the retardation Re2 of the retardation plate 24 lies in the range of 582.5 nm to 607.5 nm even if Re1 and Re2 and the combination thereof are changed.

The display of white will now be considered. With regard to the displayed color "white" of the color LCD device with the retardations Re1 and Re2 of the retardation plates 23 and 24 set in the above-given ranges, the value of a* is concentrated in the vicinity of 0 as shown in FIG. 16. But, the value of b* varies depending on the retardations Re1 and Re2 of the retardation plates 23 and 24. White becomes more colorless as the value of b* approaches 0, and becomes yellowish (Y) as the value of b* becomes larger. From the viewpoint of the purity of white (degree of colorless), therefore, the desirable retardations Re1 and Re2 of the retardation plates 23 and 24 and the combination thereof should be so set that the value of b* comes closer to 0.

The outgoing light ratio and contrast will be considered next. The farther in the upper right in. FIG. 17 the combination of the retardations Re1 and Re2 is positioned, the higher the outgoing light ratio and contrast become.

Figure 18:
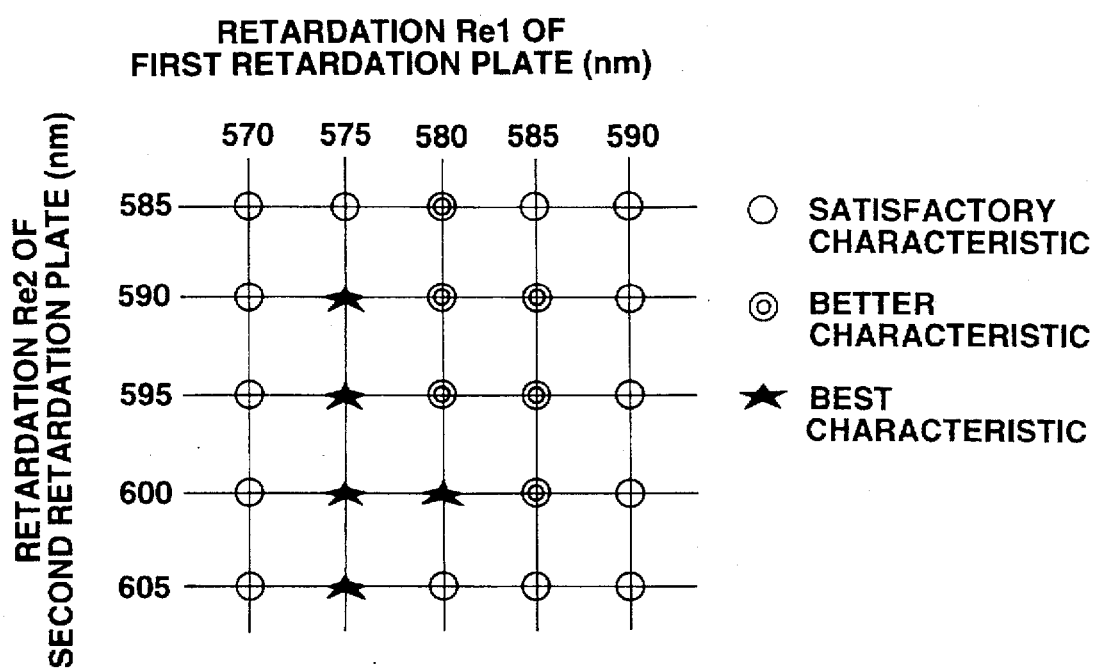
FIG. 18 is a diagram illustrating the results of the evaluation of the purity of the displayed white, the outgoing light ratio and the contrast of the first specific example of the color LCD device.
Figure 19A:
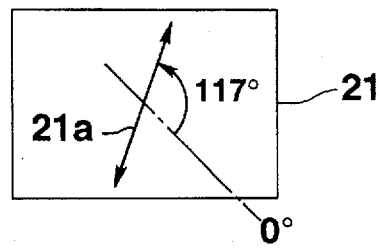
FIGS. 19A through 19E are diagrams showing the aligned state of the LC molecules and the directions of the optical axes of individual polarization plates and retardation plates of the second specific example of the color LCD device according to the first embodiment of the present invention, as viewed from the front side of the LCD device.
Figure 19B:
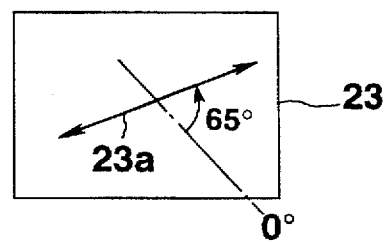
Figure 19C:
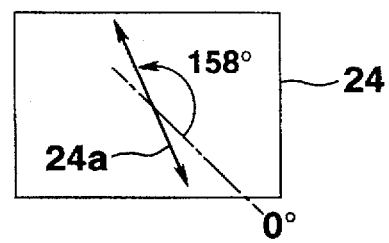
Figure 19D:
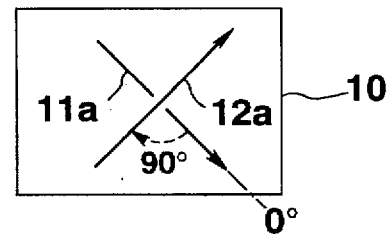
Figure 19E:
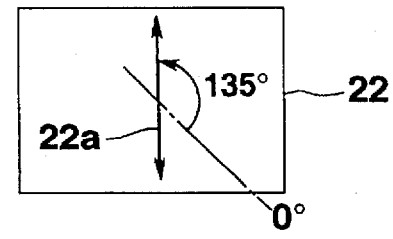

It is desirable that the retardations Re1 and Re2 of the retardation plates 23 and 24 and their combination should be so set as to provide while with a higher purity and higher outgoing light ratio and contrast. FIG. 18 illustrates the results of the General evaluation of the characteristics shown in FIGS. 16 and 17 from this viewpoint.

As shown in FIG. 18, the color LCD device shows satisfactory display characteristics if Re1=570 nm 2.5 nm to 590 nm±2.5 nm (±2.5 nm being the range of allowance) and Re2=585 nm±2.5 nm to 605 nm±2.5 nm.

Most of the color LCD devices with the retardation Re1 of the first retardation plate 23 lying in the range of 575 nm to 585 nm show display characteristics with better purity of white, outgoing light ratio and contrast.

Particularly, all of the color LCD devices with the retardation Re1 of the first retardation plate 23 ranging from 575 nm to 585 nm and the retardation Re2 of the second retardation plate 24 ranging from 590 nm to 600 nm show display characteristics with better purity of white, outgoing light ratio and contrast.

Further, the color LCD device with the retardation Re1 of the first retardation plate 23 of 575 nm and the retardation Re2 of the second retardation plate 24 ranging from 590 nm to 600 nm show the best characteristics.

Even if the retardations Re1 and Re2 of the retardation plates 23 and 24 which show better display characteristics are changed in the range of ±2.5 nm, the display characteristic are not substantially changed. Therefore, the retardations Re1 and Re2 which provide better display characteristics lie in the ranges of Re1 =575 nm±2.5 nm to 585 nm±2.5 nm and Re2 =590 nm±2.5 nm to 600 nm±2.5 nm.

The retardations Re1 and Re2 which provide the best display characteristics are Re1=575 nm±2.5 nm and Re2= 590 nm±2.5 nm to 600 nm±2.5 nm.

As shown in FIG. 18, the color LCD device with Re1=580 nm and Re2=600 nm and the one with Re1=575 nm and Re2=605 nm also show the best display characteristics.

Second Specific Example

The basic structure of the LCD device of this specific example is the same as the one shown in FIGS. 1 and 2.

As shown in FIGS. 19A to 19E, the front polarization plate 21 is arranged in such a way that its transmission axis 21a extends in the direction of approximately 117° in the opposite direction to the twist direction of the LC molecules with respect to the direction 11a of 0°, and the back polarization plate 22 is so arranged that its transmission axis 22a extends in the direction of approximately 135° in the opposite direction to the twist direction.

The first retardation plate 23 adjacent to the front polarization plate 21 is so arranged that its phase delay axis 23a extends in the direction of approximately 65° in the opposite direction to the twist direction of the LC molecules with respect to the direction 11a of 0°; and the second retardation plate 24 adjacent to the LC cell 10 is so arranged that its phase delay axis 24a extends in the direction of approximately 158° in the opposite direction to the twist direction of the LC molecules with respect to the direction 11a of 0°.

The LC cell 10 is designed so that the value of Δn.d becomes approximately 1040 nm, and the retardation Re1 of the first retardation plate 23 is about 585 nm while the retardation Re2 of the second retardation plate 24 is about 610 nm.

The front polarization plate 21 uses a low polarization degree with respect to light of a short wavelength range (light of a blue component) in the visible light range. The back polarization plate 22 uses a normal polarization degree (about 99% of the polarization degree of light in the entire visible light range). The mean polarization degree of the front polarization plate 21 with respect to the visible light range is approximately 94%, and the mean polarization degree of the back polarization plate 22 is about 99%.

As the applied voltage to the LC cell 10 increases, the display color changes in the order of red, green, blue, black and white. It is therefore possible to ensure clear and colorful multi-color display.

The value of Δn.d of LC cell 10 in this color LCD device is approximately 1040 nm, which is relatively small. Therefore, one or both of the refractive anisotropy Δn and LC layer thickness d of the liquid crystal 18 can be reduced so that this color LCD device can be driven by a lower voltage than the conventional ECB type color LCD device. Further, the retardations Re1 and Re2 of the retardation plates 23 and 24 are relatively large, so that the retardation plates 23 and 24 can provide a large birifringence effect, thus making it possible to display many colors with high purities.

Further, in this specific example, a polarization plate with a low polarization degree with respect to light of the short wavelength range in the visible light range is used as the front polarization plate 21. Thus, the amount of incident light of the short wavelength range, that is the amount of light of a blue component, is large. It is therefore possible to display bright and clear blue, which is normally difficult to do.

Moreover, the view angle dependency of the outgoing light ratio of this LCD device is reduced by the retardation plates 23 and 24, thus providing a wider view angle.

Third Specific Example

FIGS. 20A through 20E show the aligned state of the LC molecules and the directions of the optical axes of the polarization plates 21 and 22 and the retardation plates 23 and 24 of the third specific example.

Figure 20A:
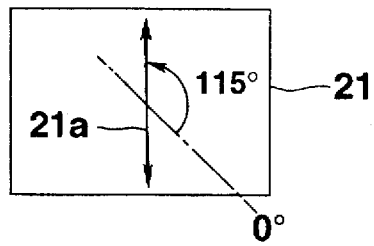
FIGS. 20A through 20E are diagrams illustrating the aligned state of the LC molecules and the directions of the optical axes of individual polarization plates and retardation plates of the third specific example of the color LCD device according to the first embodiment of the present invention, as viewed from the front side of the LCD device.
Figure 20B:
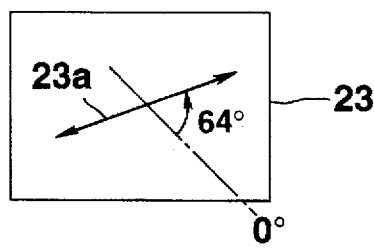
Figure 20C:
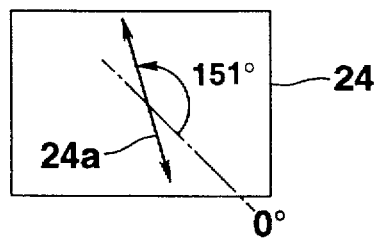
Figure 20D:
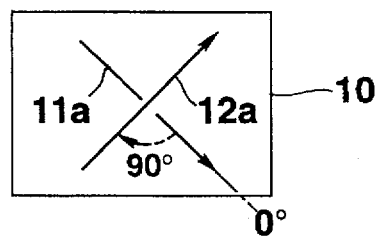
Figure 20E:
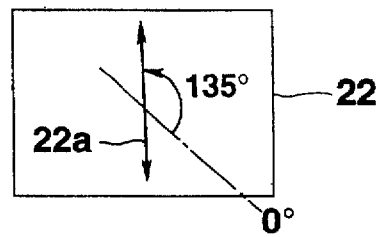

As shown in FIG. 20D, the LC molecules in this specific example are also twisted at a twist angle of approximately 90° clockwise as viewed from the front side, toward the front substrate 12 from the back substrate 11.

As shown in FIGS. 20A to 20E, the front polarization plate 21 is arranged in such a way that its transmission axis 21a extends in the direction of approximately 115° in the opposite direction to the twist direction of the LC molecules with respect to the direction 11a of 0°, and the back polarization plate 22 is so arranged that its transmission axis 22a extends in the direction of approximately 135° in the opposite direction to the twist direction.

The first retardation plate 23 is so arranged that its phase delay axis 23a extends in the direction of approximately 64° in the opposite direction to the twist direction of the LC molecules with respect to the direction 11a of 0°, and the second retardation plate 24 is so arranged that its phase delay axis 24a extends in the direction of approximately 151° in the opposite direction to the twist direction of the LC molecules with respect to the direction 11a of 0°.

The value of Δn.d of the LC cell 10 is set to approximately 920 nm, and the retardation of the first retardation plate 23 is about 375 nm while the retardation of the second retardation plate 24 is about 430 nm.

A low polarization degree with respect to light of the short wavelength range in the visible light range is used as the front polarization plate 21 and a polarization plate with the normal polarization degree is used as the back polarization plate 22 in this specific example too.

As the applied voltage to the LC cell 10 in the color LCD device of this example increases, the display color also changes in the order of red, green, blue, black and white, as mentioned above. It is therefore possible to ensure clear and colorful multi-color display.

The value of Δn.d of LC cell 10 in this color LCD device is approximately 920 nm, which is relatively small. Thus, this color LCD device can be driven by a low voltage. As the retardations Re1 and Re2 of the retardation plates 23 and 24 are relatively large, the retardation plates 23 and 24 can provide a large birifringence effect, thus making it possible to display many colors with high purities.

Further, a polarization plate with a low polarization degree with respect to light of the short wavelength range is used, so that blue can be displayed rightly and clearly. Because two retardation plates 23 and 24 are provided on the front side of the LC cell 10, the view angle is wide.

Although the transmission axes 21a and 21b of the polarization plates 21 and 22 and the phase delay axes 23a and 24a of the retardation plates 23 and 24 are arranged as shown in FIGS. 19A to 19E or FIGS. 20A to 20E in the second specific example or the third specific example, the absorption axes of the polarization plates 21 and 22 and the advancement axes of the retardation plates 23 and 24 may be set in the directions shown in FIGS. 19A to 19E or FIGS. 20A to 20E.

In the second and third specific examples, one of the two retardation plates 23 and 24 which has a smaller retardation is arranged adjacent to the front polarization plate 21, and the one with a larger retardation is placed adjacent to the LC cell 10. The retardation plate which has a larger retardation may be arranged adjacent to the front polarization plate 21, while the one with a smaller retardation may be placed adjacent to the LC cell 10.

Fourth Specific Example

FIGS. 21A through 21E show the aligned state of the LC molecules and the directions of the optical axes of the polarization plates 21 and 22 and the retardation plates 23 and 24 of the third specific example, as viewed from the front side of the LCD device.

Figure 21A:
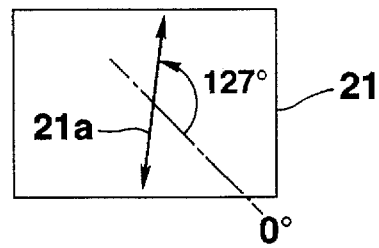
FIGS. 21A through 21E are diagrams depicting the aligned state of the LC molecules and the directions of the optical axes of individual polarization plates and retardation plates of the fourth specific example of the color LCD device according to the first embodiment of the present invention, as viewed from the front side of the LCD device.
Figure 21B:
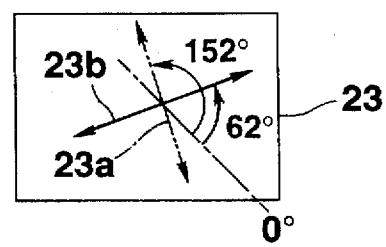
Figure 21C:
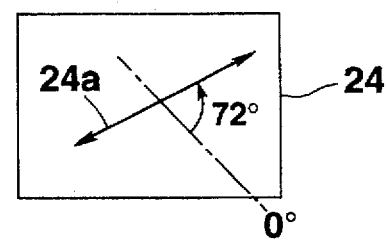
Figure 21D:
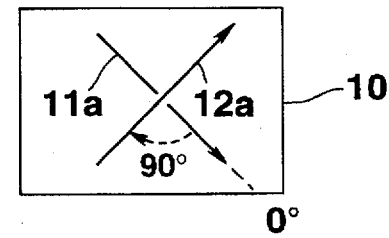

As shown in FIG. 21D, the LC molecules are twisted at a twist angle of approximately 90° clockwise as viewed from the front side, toward the front substrate 12 from the back substrate 11.

As shown in FIGS. 21A to 21E, the front polarization plate 21 is arranged in such a way that its transmission axis 21a extends in the direction of approximately 127° in the opposite direction to the twist direction of the LC molecules with respect to the direction 11a of 0°; and the back polarization plate 22 is so arranged that its transmission axis 22a extends in the direction of approximately 138° in the opposite direction to the twist direction.

The first retardation plate 23 adjacent to the front polarization plate 21 is so arranged that its phase advancement axis 23b extends in the direction of approximately 62° in the opposite direction to the twist direction of the LC molecules with respect to the direction 11a of 0°. The phase delay axis 23a of the first retardation plate 23 extends in the direction of about 152° in the opposite direction to the twist direction with respect to the direction 11a of 0°, as indicated by the chain line in FIG. 21B.

The second retardation plate 24 adjacent to the LC cell 10 is so arranged that its phase delay axis 24a extends in the direction of approximately 72° in the opposite direction to the twist direction of the LC molecules with respect to the direction 11a of 0°.

The LC cell 10 is designed so that the value of $\Delta n.d$ becomes approximately 920 nm, and the retardation of the first retardation plate 23 is about 630 nm while the retardation of the second retardation plate 24 is about 585 nm.

In this specific example, the mean polarization degrees of the front polarization plate 21 and the back polarization plate 22 with respect to the visible light range are approximately 99%.

As the voltage applied between the opposing electrodes 13 and 14 in the color LCD device of this example increases too, the display color changes in the order of red, green, blue, black and white. It is therefore possible to ensure clear and colorful multi-color display.

The $\Delta n.d$ of LC cell 10 in this color LCD device of this example is relatively small. Therefore, this color LCD device can be driven by a lower voltage than the conventional ECB type color LCD device. Further, the retardations Re1 and Re2 of the retardation plates 23 and 24 are relatively large, so that the retardation plates 23 and 24 can provide a large birifringence effect. It is therefore possible to display many colors with high purities. Because the retardation plates 23 and 24 are provided on the front side of the LC cell 10, the view angle is wide.

When the retardation plate 23 having a larger retardation is placed adjacent to the front polarization plate 21 as in this embodiment, relatively bright blue is displayed even if the front polarization plate 21 has the normal polarization degree.

The $\Delta n.d$ of the LC cell 10, the retardations Re1 and Re2 of the retardation plates 23 and 24, directions of the optical axes of the polarization plates 21 and 22 and the directions of the optical axes of the retardation plates 23 and 24 are not limited to those of the first to fourth specific examples. As long as the following conditions are met, it is possible to display black and white, which are the basic display colors, and the three primary colors of red, green and blue, thus presenting a clear and colorful image.

(i) $\Delta n.d$ of the LC cell 10 ranges from 800 nm to 1100 nm, and should range from 920 nm to 1050 nm more desirably.

(ii) The retardation Re1 of the first retardation plate 23 is in the range of 350 nm to 610 nm.

(iii) The retardation Re2 of the second retardation plate 24 is in the range of 400 nm to 650 nm.

(iv) Supposing that the alignment direction 11a of the LC molecules in the vicinity of the substrate 11 (back substrate in the above-described embodiments) on the opposite side of the LC cell 10 where the retardation plates 23 and 24 are located is considered as the direction of 0°, the transmission axis 21a or absorption axis of the polarization plate 21 (the front polarization plate in the above-described embodiments) on the side where the retardation plates 23 and 24 are located are set to the direction of 110° to 130° in the opposite direction to the twist direction of the LC molecules of the LC cell;

(v) The transmission axis 22a or absorption axis of the other polarization plate 22 is set at an angle of 127° to 140° (more preferably, 130° to 140°) in the opposite direction to the twist angle;

(vi) The phase delay axis 23a or phase advancement axis 23b of the first retardation plate 23 is set at an angle of 60° to 70° in the opposite direction to the twist angle;

(vii) The phase delay axis 24a or phase advancement axis of the second retardation plate 24 is set at an angle of 150° to 165° in the opposite direction to the twist angle.

From the general evaluation of the above-described four specific examples, it is more desirable that the color CD device of this embodiment: should be structured in such a manner that with the alignment direction 11a of the LC molecules in the vicinity of the back substrate 11 of the LC cell 10 being the direction of 0°, the transmission axis 21a of the front polarization plate 21 extends at an angle of $\theta1=115°\pm1°$ to $117°\pm1°$ in the opposite direction to the twist direction of the LC molecules of the LC cell 10; the transmission axis 22a of the back polarization plate 22 extends at an angle of $\theta2=129°\pm1°$ to $135°\pm1°$ in the opposite direction to the twist direction; the phase delay axis 23a of the first retardation plate 23 adjacent to the front polarization plate 21 extends at an angle of $\phi1=62°\pm0.5°$ to $66°\pm0.5°$ in the opposite direction to the twist direction; the phase delay axis 24a of the second retardation plate 24 adjacent to the LC cell 10 extends at an angle of $\phi2=156°\pm1°$ to $165°\pm1°$ in the opposite direction to the twist direction; the retardation Re1 of the first retardation plate 23 ranges from 575 nm±2.5 nm to 585 nm±2.5 nm; and the retardation Re2 of the second retardation plate 24 ranges from 585 nm±2.5 nm to 605 nm±2.5 lm.

The desirable values for the deviation angles $\theta1$ and $\theta2$ of the transmission axes 21a and 22a of the polarization plates 21 and 22 are in the ranges of $\theta1=115°\pm1°$ to $117°\pm1°$ and $\theta2=129°\pm1°$ to $135°\pm1°$. By setting the angles $\theta1$ and $\theta2$ of the transmission axes to such values, it is possible to display red, green and blue with high color purities and more colorless black and white at a higher outgoing light ratio and higher contrast.

Further, by setting the deviation angles $\theta1$ and $\theta2$ of the transmission axes to $\theta1=115°\pm1°$ and $\theta2=135°$, it is possible to acquire the display with better view of display colors.

Further, the most desirable values for the deviation angles $\phi1$ and $\phi2$ of the phase delay axes 23a and 24a of the retardation plates 23 and 24 are $\phi1=64°\pm1°$ and $\phi2=158°\pm1°$, and the most desirable retardations Re1 and Re2 of the retardation plates 23 and 24 are Re1=575 nm±2.2 nm and Re2=590 nm±2.2 nm to 600 nm±2.2 nm. By setting the deviation angles $\phi1$ and $\phi2$ and the retardations Re1 and Re2 to such values, it is possible to acquire the display characteristics with the highest purity of white and the highest outgoing light ratio and contrast in the results of the general evaluation.

Second Embodiment

The second embodiment of the present invention will now be described.

The basic structure of the LCD device of this embodiment is substantially the same as the one shown in FIGS. 1 and 2, except that the directions of the optical axes of the polarization plates 21 and 22 and the retardation plates 23 and 24 and the characteristics thereof differ from those of the first embodiment.

Figure 22A:
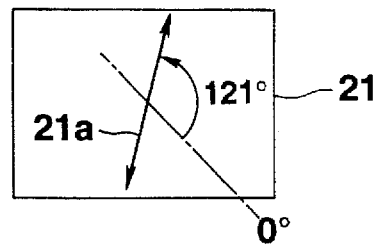
FIGS. 22A through 22E are diagrams showing the aligned state of the LC molecules and the directions of the optical axes of individual polarization plates and retardation plates of the color LCD device according to the second embodiment of the present invention, as viewed from the front side of the LCD device.
Figure 22B:
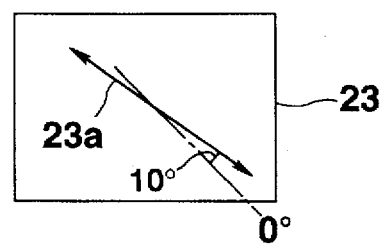
Figure 22C:
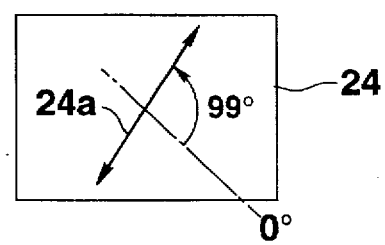
Figure 22D:
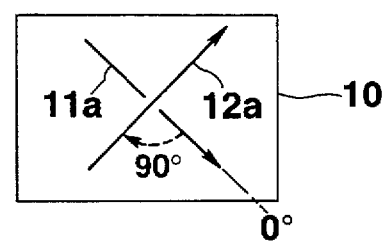

As shown in FIG. 22D, the alignment directions 11a and 12a of the LC molecules on the substrates 11 and 12 of the LC cell 10 are perpendicular to each other. The LC molecules are twisted approximately 90° clockwise (clockwise in the diagram) toward the front substrate 12 from the back substrate 11 as viewed from the front side.

Figure 22E:
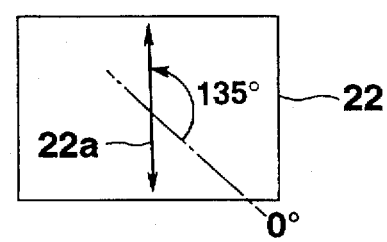

With the alignment direction 11a of the liquid crystal molecules on the back substrates 11 of the LC cell 10 is set to a direction of 0°, as shown in FIGS. 22A and 22E, the transmission axis 21a of the front polarization plates 21 is set at an angle of approximately 121° in the opposite direction (counterclockwise in the diagram) to the twist direction of the LC molecules, as viewed from the front side. The transmission axis 22a of the back polarization plate 22 is set at an angle 135° in the opposite direction to the twist direction.

As shown in FIGS. 22B and 22C, the first retardation plate 23 adjacent to the front polarization plate 21 is so arranged that its phase delay axis 23a extends in the direction of approximately 10° in the opposite direction to the twist direction of the LC molecules with respect to the direction 11a of 0°. The second retardation plate 24 adjacent to the LC cell 10 is so arranged that its phase delay axis 24a extends in the direction of approximately 99° in the opposite direction to the twist direction of the LC molecules with respect to the direction 11a of 0°.

The LC cell 10 is designed so that the value of the product $\Delta n.d$ of the refractive anisotropy $\Delta n$ of the liquid crystal 18 and the LC layer thickness d becomes approximately 830 nm, and the retardation of the first retardation plate 23 is about 585 nm while the retardation of the second retardation plate 24 is about 610 nm.

Further, the front polarization plate 21 in use has a low polarization degree with respect to light of a short wavelength range (light of a blue component) in the visible light range. The back polarization plate 22 in use has the normal polarization degree. The mean polarization degree of the front polarization plate 21 with respect to the visible light range is approximately 94%, and the mean polarization degree of the back polarization plate 22 is about 99%.

This color LCD device also uses external light and reflects incident light from the front side by the reflector 20 to display an image, as per the first embodiment. As the voltage applied between the opposing electrodes 13 and 14 increases, the display color changes in the order of red, green, blue, black and white.

Therefore, even this color LCD device can color light without using color filters and can provide bright color display. Further, a plurality of colors can be displayed by a single pixel. Moreover, it is possible to display black and white, as the basic display colors, and the three primary colors of red, green and blue to accomplish clear and colorful multi-color display.

The value of $\Delta n.d$ of LC cell 10 in the color LCD device of this embodiment is approximately 830 nm, which is relatively small, and a plurality of colors can be displayed with a low drive voltage. Further, the retardations of the retardation plates 23 and 24 are relatively large, so that the retardation plates 23 and 24 can provide a large birifringence effect, thus making it possible to display many colors and improve the color purities.

Further, a polarization plate with a low polarization degree with respect to light of the short wavelength range in the visible light range is used as the front polarization plate 21, so that blue can be displayed brightly and clearly.

Moreover, two retardation plates 23 and 24 are located on the front side of the LC cell 10, a wide view angle is ensured.

The retardation plate 24 having a smaller retardation value may be placed adjacent to the front polarization plate 21 and the retardation plate 23 with a larger retardation value may be placed adjacent to the LC cell 10.

Figure 21E:
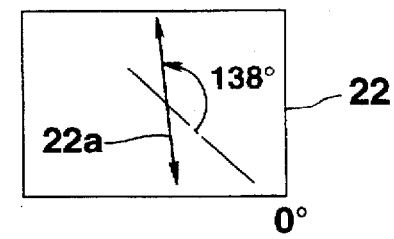

Further, the absorption axes of the polarization plates 21 and 22 may be set in the directions shown in FIGS. 21A and 21E. The phase advancement axes 23a and 24a of the retardation plates 23 and 24 may be set in the directions shown in FIGS. 21B and 21C.

The directions of the optical axes of the polarization plates 21 and 22 and the retardation plates 23 and 24, the value of $\Delta n.d$ of the LC cell 10 and the retardation values of the retardation plates 23 and 24 are not limited to those of the above-described examples.

Black and white as the basic display colors and the three primary colors of red, green and blue can be displayed to present a clear and colorful image if the transmission axis or absorption axis of the front polarization plate 21 is set in the direction of 110° to 130° in the opposite direction to the twist direction of the LC molecules, the transmission axis or absorption axis of the back polarization plate 22 is set in the direction of 130° to 140° in the opposite direction to the twist direction of the LC molecules, the phase delay axis or phase advancement axis of one of the two retardation plates 23 and 24 is set in the direction of 5° to 15° in the opposite direction to the twist direction of the LC molecules, the phase delay axis or phase advancement axis of the other retardation plate is set in the direction of 95° to 105° in the opposite direction to the twist direction of the LC molecules, the value of $\Delta n.d$ of the LC cell 10 is in the range of 800 nm to 900 nm, the retardation value of one retardation plate ranges from 450 nm to 630 nm and the retardation value of the other retardation plate ranges from 600 nm to 630 nm.

Third Embodiment

The third embodiment of the present invention will now be described.

The basic structure of the LCD device of this embodiment is substantially the same as the one shown in FIGS. 1 and 2, except that the directions of the optical axes of the polarization plates 21 and 22 and the retardation plates 23 and 24 and the characteristics thereof differ from those of the first and second embodiments.

Figure 23A:
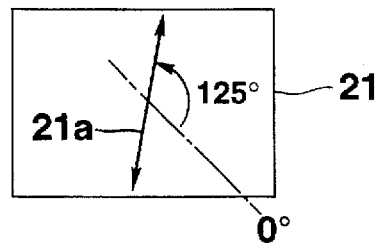
FIGS. 23A through 23E are diagrams showing the aligned state of the LC molecules and the directions of the optical axes of individual polarization plates and retardation plates of the color LCD device according to the third embodiment of the present invention, as viewed from the front side of the LCD device.
Figure 23B:
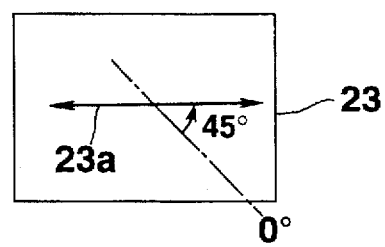
Figure 23C:
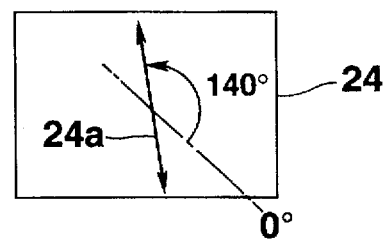
Figure 23D:
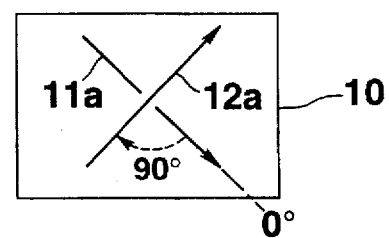

As shown in FIG. 23D, the alignment directions 11a and 12a of the LC molecules on the substrates 11 and 12 of the LC cell 10 are perpendicular to each other. The LC molecules are twisted approximately 90° clockwise (clockwise in the diagram) toward the front substrate 12 from the back substrate 11 as viewed from the front side.

With the alignment direction 11a of the liquid crystal molecules on the back substrates 11 of the LC cell 10 is set to a direction of 0°, as shown in FIG. 23A, the transmission axis 21a of the front polarization plates 21 is set at an angle of approximately 125° in the opposite direction (counterclockwise in the diagram) to the twist direction of the LC molecules. The transmission axis 22a of the back polarization plate 22 is set at an angle 160° in the opposite direction to the twist direction.

As shown in FIGS. 23B and 23C, the first retardation plate 23 adjacent to the front polarization plate 21 is so arranged that its phase delay axis 23a extends in the direction of approximately 45° in the opposite direction to the mentioned twist direction with respect to the direction 11a of 0°; and the second retardation plate 24 adjacent to the LC cell 10 is so arranged that its phase delay axis 24a extends in the direction of approximately 140° in the opposite direction to the twist direction of the LC molecules with respect to the direction 11a of 0°.

The LC cell 10 is designed so that the value of the product $\Delta n.d$ of the refractive anisotropy $\Delta n$ of the liquid crystal 18 and the LC layer thickness d becomes approximately 830 nm, and the retardation of the first retardation plate 23 is about 570 nm while the retardation of the second retardation plate 24 is about 430 nm.

Further, the front polarization plate 21 in use has a low polarization degree with respect to light of a short wavelength range in the visible light range, and the back polarization plate 22 in use has the normal polarization degree. The mean polarization degree of the front polarization plate 21 with respect to the visible light range is approximately 94%, and the mean polarization degree of the back polarization plate 22 is about 99%.

This color LCD device also uses external light and reflects incident light from the front side by the reflector 20 to display an image, as per the first embodiment, and is driven with the voltage applied between the opposing electrodes 13 and 14. As the voltage applied between the opposing electrodes 13 and 14 increases, the display color changes in the order of red, green, blue, black and white.

Therefore, this color LCD device can also display a clear and colorful image without using color filters.

The value of $\Delta n.d$ of LC cell 10 in the color LCD device of this embodiment is also relatively small, so that this device can be driven with a low drive voltage. Further, the retardations of the retardation plates 23 and 24 are relatively large, so that it is possible to display many colors and improve the color purities.

Further, a polarization plate with a low polarization degree with respect to light of the short wavelength range in the visible light range is used as the front polarization plate 21, so that blue can be displayed brightly and clearly.

Moreover, two retardation plates 23 and 24 are located on the front side of the LC cell 10, a wide view angle is ensured.

The retardation plate 24 having a smaller retardation value may be placed adjacent to the front polarization plate 21 and the retardation plate 23 with a larger retardation value may be placed adjacent to the LC cell 10.

Figure 23E:
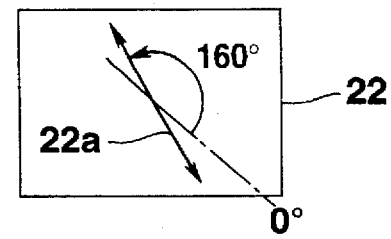

Further, the absorption axes (which are perpendicular to the transmission axes) of the polarization plates 21 and 22 may be set in the directions shown in FIGS. 23A and 23E. The phase advancement axes of the retardation plates 23 and 24 may be set in the directions shown in FIGS. 23B and 23C.

The directions of the optical axes of the polarization plates 21 and 22 and the retardation plates 23 and 24, the value of $\Delta n.d$ of the LC cell 10 and the retardation values of the retardation plates 23 and 24 are not limited to those of the above-described examples. With the alignment direction 11a of the LC molecules on the back substrate 11 being set to the direction of 0°, black and white as the basic display colors and the three primary colors of red, green and blue can be displayed to present a clear and colorful image if the transmission axis or absorption axis of the front polarization plate 21 is set in the direction of 120° to 130° in the opposite direction to the twist direction of the LC molecules, the transmission axis or absorption axis of the back polarization plate 22 is set in the direction of 150° to 170° in the opposite direction to the twist direction of the LC molecules, the phase delay axis or phase advancement axis of one of the two retardation plates 23 and 24 is set in the direction of 40° to 50° in the opposite direction to the twist direction of the LC molecules, the phase delay axis or phase advancement axis of the other retardation plate is set in the direction of 130° to 150° in the opposite direction to the twist direction of the LC molecules, the value of $\Delta n.d$ of the LC cell 10 is in the range of 800 nm to 900 nm, the retardation value of one retardation plate ranges from 550 to 600 nm and the retardation value of the other retardation plate ranges from 400 nm to 450 nm.

Fourth Embodiment

The fourth embodiment of the present invention will now be described.

The basic structure of the LCD device of this embodiment is substantially the same as the one shown in FIGS. 1 and 2, except that the directions of the optical axes of the polarization plates 21 and 22 and the retardation plates 23 and 24 and the characteristics thereof differ from those of the first embodiment.

Figure 24A:
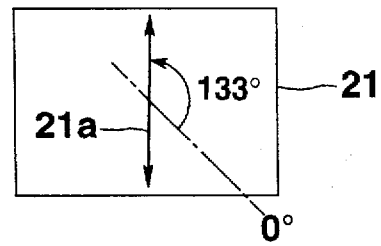
FIGS. 24A through 24E are diagrams showing the aligned state of the LC molecules and the directions of the optical axes of individual polarization plates and retardation plates of the color LCD device according to the fourth embodiment of the present invention, as viewed from the front side of the LCD device.
Figure 24B:
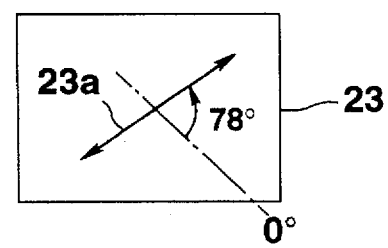
Figure 24C:
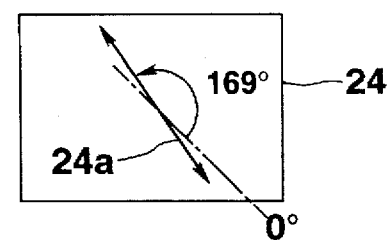
Figure 24D:
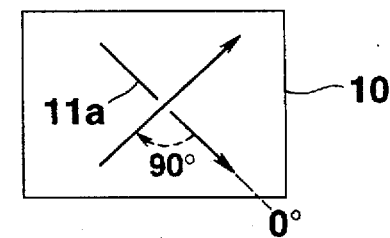
Figure 24E:
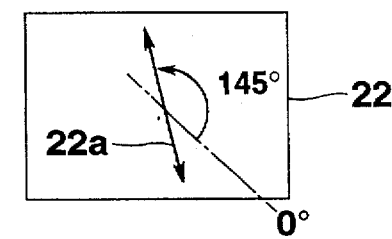

As shown in FIG. 24D, the alignment directions 11a and 12a of the LC molecules on the substrates 11 and 12 of the LC cell 10 are perpendicular to each other. The LC molecules are twisted approximately 90° clockwise (clockwise in the diagram) toward the front substrate 12 from the back substrate 11 as viewed from the front side.

With the alignment direction 11a of the liquid crystal molecules on the back substrates 11 of the LC cell 10 is set to the direction of 0°, the transmission axis 21a of the front polarization plates 21 is set at an angle of approximately 133° in the opposite direction (counterclockwise in the diagram) to the twist direction of the LC molecules, as viewed from the front side. The transmission axis 22a of the back polarization plate 22 is set at an angle 145° in the opposite direction to the twist direction.

The first retardation plate 23 adjacent to the front polarization plate 21 is so arranged that its phase delay axis 23a extends in the direction of approximately 78° in the opposite direction to the twist direction of the LC molecules with respect to the direction 11a of 0°. The second retardation plate 24 adjacent to the LC cell 10 is so arranged that its phase delay axis 24a extends in the direction of approximately 169° in the opposite direction to the twist direction of the LC molecules with respect to the direction 11a of 0°.

The LC cell 10 is designed so that the value of the product $\Delta n.d$ of the refractive anisotropy $\Delta n$ of the liquid crystal 18 and the LC layer thickness d becomes approximately 830 nm, and the retardation of the first retardation plate 23 is about 410 nm while the retardation of the second retardation plate 24 is about 375 nm.

Further, the front polarization plate 21 in use has a low polarization degree with respect to light of a short wavelength range (light of a blue component) in the visible light range, and the back polarization plate 22 in use has the normal polarization degree. The mean polarization degree of the front polarization plate 21 with respect to the visible light range is approximately 94%, and the mean polarization degree of the back polarization plate 22 is about 99%.

This color LCD device also uses external light to display an image. As the voltage to be applied between the opposing electrodes 13 and 14 increases, the display color changes in the order of red, green, blue, black and white. Therefore, the color LCD device of this embodiment can also display clear and colorful images.

The value of Δn.d of LC cell 10 is relatively small, and this device can be driven with a low voltage. Further, the birifringence effects of the retardation plates 23 and 24 are large so that many colors can be displayed with high purities.

Further, a polarization plate with a low polarization degree with respect to light of the short wavelength range is used as the front polarization plate 21, so that blue can be displayed brightly and clearly.

Moreover, two retardation plates 23 and 24 are located on the front side of the LC cell 10, a wide view angle is ensured.

The retardation plate 24 having a smaller retardation value may be placed adjacent to the front polarization plate 21 and the retardation plate 23 with a larger retardation value may be placed adjacent to the LC cell 10.

Further, the absorption axes (which are perpendicular to the transmission axes) of the polarization plates 21 and 22 may be set in the directions shown in FIGS. 23A and 23E. The phase advancement axes of the retardation plates 23 and 24 may be set in the directions shown in FIGS. 23B and 23C.

The directions of the optical axes of the polarization plates 21 and 22 and the retardation plates 23 and 24, the value of Δn-d of the LC cell 10 and the retardation values of the retardation plates 23 and 24 are not limited to those of the above-described examples. With the alignment direction 11a of the LC molecules on the back substrate 11 of the LC cell 10 being set to the direction of 0°, black and white as the basic display colors and the three primary colors of red, green and blue can be displayed to present a clear and colorful image if the transmission axis or absorption axis of the front polarization plate 21 is set in the direction of 125° to 140° in the opposite direction to the twist direction of the LC molecules, the transmission axis or absorption axis of the back polarization plate 22 is set in the direction of 140° to 150° in the opposite direction to the twist direction of the LC molecules, the phase delay axis or phase advancement axis of one of the two retardation plates 23 and 24 is set in the direction of 70° to 85° in the opposite direction to the twist direction of the LC molecules, the phase delay axis or phase advancement axis of the other retardation plate is set in the direction of 160° to 175° in the opposite direction to the twist direction of the LC molecules, the value of Δn.d of the LC cell 10 is in the range of 800 nm to 900 nm, the retardation value of one retardation plate ranges from 400 nm to 430 nm and the retardation value of the other retardation plate ranges from 350 nm to 400 nm.

Although the display colors discussed in the sections of the first to fourth embodiments are displayed by a single pixel, combined colors of those displayed by a plurality of adjoining pixels may be expressed by the combination of those pixels.

Although the color LCD devices of the first to fourth embodiments are of a reflection type which has the reflector 20, the present invention may be adapted to a transmission type color LCD device which has no reflector and uses light from the back light to display an image.

Although the retardation plates 23 and 24 are located between the front polarization plate 21 and the LC cell 10 in the first to fourth embodiments, the retardation plates 23 and 24 may be arranged between the back polarization plate 22 and the LC cell 10.

Although the LC cell 10 in use in each of the above-described embodiments is of an active matrix type which has a plurality of TFTs arranged in an array, this LC cell 10 may be an active matrix type which has MIM type elements having the diode characteristics. Further, the LC cell 10 may be a direct matrix type or a segment type.

What is claimed is:

1. A color liquid crystal display device comprising:

a liquid crystal cell having liquid crystal held between a pair of substrates on which electrodes are formed, molecules of said liquid crystal being twisted from one substrate side to the other substrate side in a predetermined direction at a twist angle of substantially 90°;

a pair of polarization plates arranged with said liquid crystal cell held in between; and two retardation plates located between one of said pair of polarization plates and said liquid crystal cell, wherein a value of a product Δn.d of a refractive anisotropy Δn of liquid crystal of said liquid crystal cell and a liquid crystal layer thickness d, values of retardations of said two retardation plates, directions of optical axes of said pair of polarization plates and optical axes of said two retardation plates are set in such a manner that colors of outgoing light, when incident light is white change at least to red, green, blue, black and white in accordance with a voltage to be applied between said electrodes of both substrates of said liquid crystal cell, wherein when an alignment direction of said liquid crystal molecules with respect to one of said substrates of said liquid crystal cell is set to a direction of 0°, said optical axis of one of said pair of polarization plates extends in a direction of 110° to 140° with respect to said direction of 0° in an opposite direction to said twist direction of said liquid crystal molecules of said liquid crystal cell, and said optical axis of the other polarization plate extends in a direction of 127° to 170° with respect to said direction of 0° in an opposite direction to said twist direction.

2. The color liquid crystal display device according to claim 1, wherein a first retardation plate of said two retardation plates has an optical axis set in a direction of 5° to 15°, 40° to 50° or 60° to 85° in an opposite direction to said twist direction of said liquid crystal molecules with respect to said direction of 0°; and a second retardation plate of said two retardation plates has an optical axis set in a direction of 95° to 105° or 150° to 175° in an opposite direction to said twist direction with respect to said direction of 0°.

3. The color liquid crystal display device according to claim 1, wherein said optical axis of said one polarization plate extends in a direction of 110° to 140° in an opposite direction to said twist direction of said liquid crystal molecules of said liquid crystal cell and said optical axis of said other polarization plate extends in a direction of 127° to 140° in an opposite direction to said twist direction;

a first retardation plate of said two retardation plates has an optical axis set in a direction of 60° to 70° in an opposite direction to said twist direction of said liquid crystal molecules with respect to said direction of 0°; and a second retardation plate of said two retardation plates has an optical axis set in a direction of 150° to 165° in an opposite direction to said twist direction with respect to said direction of 0°.

4. The color liquid crystal display device according to claim 1, wherein said optical axis of said one polarization plate extends in a direction of 113°±1° to 119°±1° with respect to said direction of 0° in an opposite direction to said twist direction of said liquid crystal molecules of said liquid crystal cell, and said optical axis of said other polarization plate extends in a direction of 127°±1° to 137°±1° with respect to said direction of 0° in an opposite direction to said twist direction;

a first retardation plate of said two retardation plates has an optical axis set in a direction of 61°±1° to 67°±1° in an opposite direction to said twist direction of said liquid crystal molecules with respect to said direction of 0°; and a second retardation plate of said two retardation plates has an optical axis set in a direction of 156°±1° to 160°±1° in an opposite direction to said twist direction with respect to said direction of 0°.

5. The color liquid crystal display device according to claim 1, wherein said optical axis of said one polarization plate extends in a direction of 115°±1° to 117°±1° with respect to said direction of 0° in an opposite direction to said twist direction of said liquid crystal molecules of said liquid crystal cell, and said optical axis of said other polarization plate extends in a direction of 129°±1° to 135°±1° with respect to said direction of 0° in an opposite direction to said twist direction;

a first retardation plate of said two retardation plates has an optical axis set in a direction of 62°±0.5° to 66°±0.5° in an opposite direction to said twist direction of said liquid crystal molecules with respect to said direction of 0°; and a second retardation plate of said two retardation plates has an optical axis set in a direction of 156°±1° to 159°±1° in an opposite direction to said twist direction with respect to said direction of 0°.

6. A color liquid crystal display device comprising:

a liquid crystal cell having liquid crystal held between a pair of substrates on which electrodes are formed, molecules of said liquid crystal being twisted from one substrate side to the other substrate side in a predetermined direction at a twist angle of substantially 90°;

a pair of polarization plates arranged with said liquid crystal cell held in between; and two retardation plates located between one of said pair of polarization plates and said liquid crystal cell, wherein a value of a product $\Delta n.d$ of a refractive anisotropy $\Delta n$ of liquid crystal of said liquid crystal cell and a liquid crystal layer thickness d, values of retardations of said two retardation plates, directions of optical axes of said pair of polarization plates and optical axes of said two retardation plates are set in such a manner that colors of outgoing light, when incident light is white change at least to red, green, blue, black and white in accordance with a voltage to be applied between said electrodes of both substrates of said liquid crystal cell, and wherein said value of $\Delta n.d$ of said liquid crystal cell is 800 nm to 1100 nm, a first retardation plate of said two retardation plates has a retardation value of 350 nm to 630 nm, and a second retardation plate has a retardation value of 400 nm to 650 nm.

7. The color liquid crystal display device according to claim 6, wherein said value of $\Delta n.d$ of said liquid crystal cell is 920 nm to 1050 nm;

said retardation value of said first retardation plate is 570 nm±2.5 nm to 590 nm±2.5 nm; and said retardation value of said second retardation plate is 580 nm±2.5 nm to 605 nm±2.5 nm.

8. The color liquid crystal display device according to claim 6, wherein said value of $\Delta n.d$ of said liquid crystal cell is 920 nm to 1050 nm;

said retardation value of said first retardation plate is 575 nm±2.5 nm to 585 nm±2.5 nm; and said retardation value of said second retardation plate is 590 nm±2.5 nm to 600 nm±2.5 nm.

9. The color liquid crystal display device according to claim 6, wherein said value of $\Delta n.d$ of said liquid crystal cell is 800 nm to 900 nm;

said retardation value of said first retardation plate is 450 nm to 630 nm; and said retardation value of said second retardation plate is 600 nm to 630 nm.

10. The color liquid crystal display device according to claim 6, wherein said value of $\Delta n.d$ of said liquid crystal cell is 800 nm to 900 nm;

said retardation value of said first retardation plate is 550 nm to 600 nm; and said retardation value of said second retardation plate is 400 nm to 450 nm.

11. The color liquid crystal display device according to claim 6, wherein said value of $\Delta n.d$ of said liquid crystal cell is 800 nm to 900 nm;

said retardation value of said first retardation plate is 400 nm to 430 nm; and said retardation value of said second retardation plate is 350 nm to 400 nm.

12. A color liquid crystal display device comprising:

a liquid crystal cell having liquid crystal held between a pair of substrates on which electrodes are formed, molecules of said liquid crystal being twisted from one substrate side to the other substrate side in a predetermined direction at a twist angle of substantially 90°;

a pair of polarization plates arranged with said liquid crystal cell held in between; and two retardation plates located between one of said pair of polarization plates and said liquid crystal cell, wherein a value of a product $\Delta n.d$ of a refractive anisotropy $\Delta n$ of liquid crystal of said liquid crystal cell and a liquid crystal layer thickness d, values of retardations of said two retardation plates, directions of optical axes of said pair of polarization plates and optical axes of said two retardation plates are set in such a manner that colors of outgoing light, when incident light is white change at least to red, green, blue, black and white in accordance with a voltage to be applied between said electrodes of both substrates of said liquid crystal cell, and wherein a first retardation plate of said two retardation plates has a retardation value of 350 nm to 610 nm, a second retardation plate has a retardation value of 400 nm to 650 nm, and when an alignment direction of said liquid crystal molecules with respect to one of said substrates of said liquid crystal cell is set to a direction of 0°, said optical axis of one of said pair of polarization plates extends in a direction of 5° to 15°, 40° to 50° or 60° to 85° with respect to said direction of 0° in an opposite direction to a twist direction of said liquid crystal molecules of said liquid crystal cell and said optical axis of the other polarization plate extends in a direction of 95° to 105° or 130° to 175° with respect to said direction of 0° in an opposite direction to said twist direction.

13. The color liquid crystal display device according to claim 12, wherein said retardation value of said first retardation plate is 570 nm±2.5 nm to 590 nm±2.5 nm, said retardation value of said second retardation plate is 580 nm±2.5 nm to 605 nm±2.5 nm, and when an alignment direction of said liquid crystal molecules near one of said substrates of said liquid crystal cell is set to a direction of 0°, said optical axis of one of said pair of polarization plates extends in a direction of 60° to 70° with respect to said direction of 0° in an opposite direction to a twist direction of said liquid crystal molecules of said liquid crystal cell and said optical axis of the other polarization plate extends in a direction of 150° to 165° with respect to said direction of 0° in an opposite direction to said twist direction.

14. The color liquid crystal display device according to claim 12, wherein said retardation value of said first retardation plate is 450 nm to 630 nm, said retardation value of said second retardation plate is 600 nm to 630 nm, and when an alignment direction of said liquid crystal molecules with respect to one of said substrates of said liquid crystal cell is set to a direction of 0°, said optical axis of one of said pair of polarization plates extends in a direction of 5° to 15° with respect to said direction of 0° in an opposite direction to a twist direction of said liquid crystal molecules of said liquid crystal cell and said optical axis of the other polarization plate extends in a direction of 95° to 105° in an opposite direction to said twist direction.

15. The color liquid crystal display device according to claim 12, wherein said retardation value of said first retardation plate is 550 nm to 600 nm, said retardation value of said second retardation plate is 400 nm to 450 nm, and when an alignment direction of said liquid crystal molecules with respect to one of said substrates of said liquid crystal cell is set to a direction of 0°, said optical axis of one of said pair of polarization plates extends in a direction of 40° to 50° in an opposite direction to a twist direction of said liquid crystal molecules of said liquid crystal cell and said optical axis of the other polarization plate extends in a direction of 130° to 150° with respect to said direction of 0° in an opposite direction to said twist direction.

16. The color liquid crystal display device according to claim 12, wherein said retardation value of said first retardation plate is 400 nm to 430 nm, said retardation value of said second retardation plate is 350 nm to 400 nm, and when an alignment direction of said liquid crystal molecules with respect to one of said substrates of said liquid crystal cell is set to a direction of 0°, said optical axis of one of said pair of polarization plates extends in a direction of 70° to 85° in an opposite direction to a twist direction of said liquid crystal molecules of said liquid crystal cell and said optical axis of the other polarization plate extends in a direction of 160° to 175° in an opposite direction to said twist direction.

17. A color liquid crystal display device comprising:

a liquid crystal cell having liquid crystal held between a pair of substrates on which electrodes are formed, molecules of said liquid crystal being twisted from one substrate side to the other substrate side in a predetermined direction at a twist angle of substantially 90°;

a pair of polarization plates arranged with said liquid crystal cell held in between; and two retardation plates located between one of said pair of polarization plates and said liquid crystal cell, wherein a value of a product $\Delta n \cdot d$ of a refractive anisotropy $\Delta n$ of liquid crystal of said liquid crystal cell and a liquid crystal layer thickness d, values of retardations of said two retardation plates, directions of optical axes of said pair of polarization plates and optical axes of said two retardation plates are set in such a manner that colors of outgoing light, when incident light is white change at least to red, green, blue, black and white in accordance with a voltage to be applied between said electrodes of both substrates of said liquid crystal cell, wherein a first retardation plate of said two retardation plates has a retardation value of 350 nm to 630 nm, and a second retardation plate of said two retardation plates has a retardation value of 400 nm to 650 nm, wherein when an alignment direction of said liquid crystal molecules with respect to one of said substrates of said liquid crystal cell is set to a direction of 0°, said optical axis of one of said pair of polarization plates extends in a direction of 110° to 140° with respect to said direction of 0° in an opposite direction to said twist direction of said liquid crystal molecules of said liquid crystal cell, and said optical axis of the other polarization plate extends in a direction of 127° to 170° in an opposite direction to said twist direction, and wherein an optical axis of said first retardation plate extends in a direction of 5° to 15°, 40° to 50° or 60° to 80° with respect to said direction of 0° in an opposite direction to said twist direction of said liquid crystal molecules of said liquid crystal cell and said optical axis of said second retardation plate extends in a direction of 95° to 105° or 130° to 175° with respect to said direction of 0° in an opposite direction to said twist direction.

18. The color liquid crystal display device according to claim 17, wherein said optical axis of said one polarization plate extends in a direction of 113°±1° to 119°±1° with respect to said direction of 0° in opposite direction to said twist direction of said liquid crystal molecules of said liquid crystal cell with respect to said direction of 0° and said optical axis of said other polarization plate extends in a direction of 127°±1° to 137°±1° with respect to said direction of 0° in an opposite direction to said twist direction with respect to said direction of 0°; and said first retardation plate has an optical axis set in a direction of 61°±1° to 67°±1° in an opposite direction to said twist direction of said liquid crystal molecules with respect to said direction of 0°, and said second retardation plate of said two retardation plates has an optical axis set in a direction of 156°±1° to 160°±1° in an opposite direction to said twist direction with respect to said direction of 0°.

19. The color liquid crystal display device according to claim 17, wherein said optical axis of said one polarization plate extends in a direction of 115°±1° to 117°±1° in an opposite direction to said twist direction of said liquid crystal molecules of said liquid crystal cell with respect to said direction of 0°, and said optical axis of said other polarization plate extends in a direction of 129°±1° to 135°±1° in an opposite direction to said twist direction with respect to said direction of 0°; and said first retardation plate has an optical axis set in a direction of 62°±0.5° to 66°±0.5° in an opposite direction to said twist direction of said liquid crystal molecules with respect to said direction of 0°, and said second retardation plate of said two retardation plates has an optical axis set in a direction of 156°±1° to 160°±1° in an opposite direction to said twist direction with respect to said direction of 0°.

20. The color liquid crystal display device according to claim 17, wherein said optical axis of said one polarization plate extends in a direction of 110° to 130° in an opposite direction to said twist direction of said liquid crystal molecules of said liquid crystal cell with respect to said direction of 0° and said optical axis of said other polarization plate extends in a direction of 130° to 140° in an opposite direction to said twist direction with respect to said direction of 0°; and said first retardation plate has an optical axis set in a direction of 5° to 15° in an opposite direction to said twist direction of said liquid crystal molecules with respect to said direction of 0°, and said second retardation plate of said two retardation plates has an optical axis set in a direction of 95° to 105° in an opposite direction to said twist direction with respect to said direction of 0°.

21. The color liquid crystal display device according to claim 17, wherein said optical axis of said one polarization plate extends in a direction of 120° to 130° in an opposite direction to said twist direction of said liquid crystal molecules of said liquid crystal cell with respect to said direction of 0° and said optical axis of said other polarization plate extends in a direction of 150° to 170° in an opposite direction to said twist direction with respect to said direction of 0°; and said first retardation plate has an optical axis set in a direction of 40° to 50° in an opposite direction to said twist direction of said liquid crystal molecules with respect to said direction of 0°, and said second retardation plate of said two retardation plates has an optical axis set in a direction of 130° to 150° in an opposite direction to said twist direction with respect to said direction of 0°.

22. The color liquid crystal display device according to claim 17, wherein said optical axis of said one polarization plate extends in a direction of 125° to 140° in an opposite direction to said twist direction of said liquid crystal molecules of said liquid crystal cell with respect to said direction of 0° and said optical axis of said other polarization plate extends in a direction of 140° to 150° in an opposite direction to said twist direction with respect to said direction of 0°; and said first retardation plate has an optical axis set in a direction of 70° to 85° in an opposite direction to said twist direction of said liquid crystal molecules with respect to said direction of 0°, and said second retardation plate of said two retardation plates has an optical axis set in a direction of 160° to 175° in an opposite direction to said twist direction with respect to said direction of 0°.

* * * * *